(12) United States Patent
Lee et al.

(10) Patent No.: US 12,538,373 B2
(45) Date of Patent: Jan. 27, 2026

(54) ELECTRONIC DEVICE SUPPORTING DUAL CONNECTIVITY AND OPERATION METHOD THEREOF

(71) Applicant: SAMSUNG ELECTRONICS CO., LTD., Suwon-si (KR)

(72) Inventors: Keonyoung Lee, Suwon-si (KR); Hyeyeon Kong, Suwon-si (KR); Poongup Lee, Suwon-si (KR); Youngsoo Kim, Suwon-si (KR); Minwoong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 362 days.

(21) Appl. No.: 18/297,165

(22) Filed: Apr. 7, 2023

(65) Prior Publication Data
US 2023/0328826 A1    Oct. 12, 2023

Related U.S. Application Data

(63) Continuation of application No. PCT/KR2023/004615, filed on Apr. 5, 2023.

(30) Foreign Application Priority Data

Apr. 7, 2022   (KR) .................. 10-2022-0043580
Apr. 13, 2022  (KR) .................. 10-2022-0045813
(Continued)

(51) Int. Cl.
*H04W 76/16*   (2018.01)
*H04W 52/24*   (2009.01)
*H04W 52/36*   (2009.01)

(52) U.S. Cl.
CPC ......... *H04W 76/16* (2018.02); *H04W 52/242* (2013.01); *H04W 52/367* (2013.01)

(58) Field of Classification Search
CPC . H04W 76/16; H04W 52/242; H04W 52/245; H04W 52/367; H04W 76/15
See application file for complete search history.

(56) References Cited

U.S. PATENT DOCUMENTS 10,674,395 B2    6/2020  Mukherjee et al.
2011/0296064 A1  12/2011 Ehsan et al.
(Continued)

FOREIGN PATENT DOCUMENTS

KR      20100126354 A    12/2010
KR      102065489 B1     1/2020
(Continued)

OTHER PUBLICATIONS

Om et al., "Implementation of Wireless Communication System for Controlling Unmanned Aircraft Based on Commercial LTE Network", Journal of KIIT, vol. 18, No. 6, pp. 97-105, Jun. 30, 2020, 9 pages.
(Continued)

*Primary Examiner* — Shukri Taha
(74) *Attorney, Agent, or Firm* — NIXON & VANDERHYE P.C.

(57) ABSTRACT

According to an embodiment, an electronic device may comprise at least one communication processor. The at least one communication processor may be configured to: establish, based on dual connectivity, a first connection based on a first radio access technology (RAT) and a second connection based on a second RAT; transmit first uplink data based on the first connection and transmit second uplink data based on the second connection, wherein a throughput corresponding to the second connection may be a first value; identify at least one first parameter associated with the first connection and at least one second parameter associated with the second connection; perform at least one operation for transmitting, based on the second connection, uplink (UL) data with a
(Continued)

throughput less than the first value, based on the at least one first parameter satisfying a first condition indicating a good uplink channel state and that the at least one second parameter satisfying a second condition indicating a poor uplink channel state; and based on performing the at least one operation, transmit third uplink data based on the first connection and transmit fourth uplink data based on the second connection, wherein a throughput corresponding to the second connection may be less than the first value.

20 Claims, 29 Drawing Sheets

(30) Foreign Application Priority Data

Jul. 7, 2022 (KR) .................. 10-2022-0083477
Aug. 22, 2022 (KR) .................. 10-2022-0105052

(56) References Cited

U.S. PATENT DOCUMENTS

| | | |
|---|---|---|
| 2013/0301435 A1 | 11/2013 | Panah et al. |
| 2016/0205606 A1 | 7/2016 | Park et al. |
| 2018/0227960 A1 | 8/2018 | Belghoul et al. |
| 2019/0124546 A1* | 4/2019 | Phuyal .................. H04W 72/21 |
| 2020/0015302 A1 | 1/2020 | Shikari et al. |
| 2020/0163095 A1 | 5/2020 | Kim et al. |
| 2020/0344839 A1 | 10/2020 | Kwok et al. |
| 2021/0307096 A1 | 9/2021 | Lee |
| 2021/0314883 A1 | 10/2021 | Latheef |
| 2021/0345454 A1 | 11/2021 | Dhanapal et al. |
| 2021/0400748 A1 | 12/2021 | Subramanian et al. |
| 2021/0409086 A1 | 12/2021 | Yerramalli et al. |
| 2023/0363028 A1* | 11/2023 | Da Silva ............... H04W 76/15 |

FOREIGN PATENT DOCUMENTS

| | | |
|---|---|---|
| KR | 10-2021-0040169 | 4/2021 |
| KR | 102304027 B1 | 9/2021 |
| WO | 2019/017746 | 1/2019 |
| WO | WO-2022031203 A1 * | 2/2022 ........ H04W 36/0069 |

OTHER PUBLICATIONS

Extended European Search Report dated Mar. 25, 2025 issued in European Patent Application No. 23785002.9.

Search Report and Written Opinion dated Jun. 26, 2023 issued in International Patent Application No. PCT/KR2023/004615.

* cited by examiner

ELECTRONIC DEVICE SUPPORTING DUAL CONNECTIVITY AND OPERATION METHOD THEREOF

CROSS-REFERENCE TO RELATED APPLICATIONS

This application is a continuation of International Application No. PCT/KR2023/004615 designating the United States, filed on Apr. 5, 2023, in the Korean Intellectual Property Receiving Office and claiming priority to Korean Patent Application Nos. 10-2022-0043580, filed on Apr. 7, 2022, 10-2022-0045813, filed on Apr. 13, 2022, 10-2022-0083477, filed on Jul. 7, 2022, and 10-2022-0105052, filed on Aug. 22, 2022, in the Korean Intellectual Property Office, the disclosures of all of which are incorporated by reference herein in their entireties.

BACKGROUND

Field

The disclosure relates to an electronic device supporting dual connectivity and an operation method thereof.

Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on ultra-high frequency bands as well as those used for 3G and long-term evolution (LTE).

To implement 5G communication, stand-alone (SA) and non-stand alone (NSA) schemes are taken into consideration. Of the two, the NSA scheme may include an E-UTRA NR dual connectivity (EN-DC) scheme that uses the new radio (NR) system along with the legacy LTE system. In the NSA scheme, user equipment (UE) may use not only eNBs of the LTE system but also gNBs of the NR system. Technology allowing a UE to use heterogeneous communication systems may be termed dual connectivity.

Dual connectivity has been proposed in 3rd generation partnership project (3GPP) release-12 where the 3.5 GHz frequency band other than that for LTE system is used for small cells. For dual connectivity proposed in 3GPP release-12 in the EN-DC scheme, it is under discussion to use LTE network communication as a master node and NR network communication as a secondary node.

The user equipment (UE) may receive a message (e.g., an RRC connection reconfiguration message) intending to report at least one parameter corresponding to a neighbor cell from the master node. The UE may measure at least one parameter of a signal from the base station of the neighbor cell and report it to the master node. The master node may determine to add a specific base station as a secondary node (SN) and instruct the UE to add the secondary cell group (SCG). The UE may transmit and receive data to/from the network based on two network communications. The UE supporting EN-DC may simultaneously support LTE communication and 5G communication. For example, the UE may transmit and receive control plane data and user plane data via LTE communication and transmit and receive user plane data via 5G communication.

SUMMARY

According to an example embodiment, an electronic device may comprise at least one communication processor. The at least one communication processor may be configured to: establish, based on dual connectivity, a first connection based on a first radio access technology (RAT) and a second connection based on a second RAT; transmit first uplink data based on the first connection and transmit second uplink data based on the second connection, wherein a throughput corresponding to the second connection may be a first value; identify at least one first parameter associated with the first connection and at least one second parameter associated with the second connection; perform at least one operation for transmitting, based on the second connection, uplink (UL) data with a throughput less than the first value, based on the at least one first parameter satisfying a first condition indicating a good uplink channel state and that the at least one second parameter satisfying a second condition indicating a poor uplink channel state; and based on performing the at least one operation, transmit third uplink data based on the first connection and transmit fourth uplink data based on the second connection, wherein a throughput corresponding to the second connection may be less than the first value.

According to an example embodiment, a method of operating an electronic device may comprise: establishing, based on dual connectivity, a first connection based on a first radio access technology (RAT) and a second connection based on a second RAT; transmitting first uplink data based on the first connection and transmitting second uplink data based on the second connection, wherein a throughput corresponding to the second connection may be a first value; identifying at least one first parameter associated with the first connection and at least one second parameter associated with the second connection; performing at least one operation for transmitting uplink (UL) data with a throughput less than the first value based on the second connection, based on the at least one first parameter satisfying a first condition indicating a good uplink channel state and that the at least one second parameter satisfying a second condition indicating a poor uplink channel state; and based on performing the at least one operation, transmitting third uplink data based on the first connection and transmitting fourth uplink data based on the second connection, wherein a throughput corresponding to the second connection may be less than the first value.

According to an example embodiment, there may be provided a non-transitory computer-readable storage medium storing at least one instruction. The at least one instruction may, when executed by at least one processor, cause an electronic device to perform operations comprising: establishing, based on dual connectivity, a first connection based on a first radio access technology (RAT) and a second connection based on a second RAT; transmitting first uplink data based on the first connection and transmitting second uplink data based on the second connection, wherein a throughput corresponding to the second connection may be a first value; identifying at least one first parameter associated with the first connection and at least one second parameter associated with the second connection; performing at least one operation for transmitting uplink (UL) data with a throughput less than the first value based on the second connection, based on the at least one first parameter satisfying a first condition indicating a good uplink channel state and that the at least one second parameter satisfying a second condition indicating a poor uplink channel state; and based on performing the at least one operation, transmitting third uplink data based on the first connection and transmitting fourth uplink data based on the second connection, wherein a throughput corresponding to the second connection may be less than the first value.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
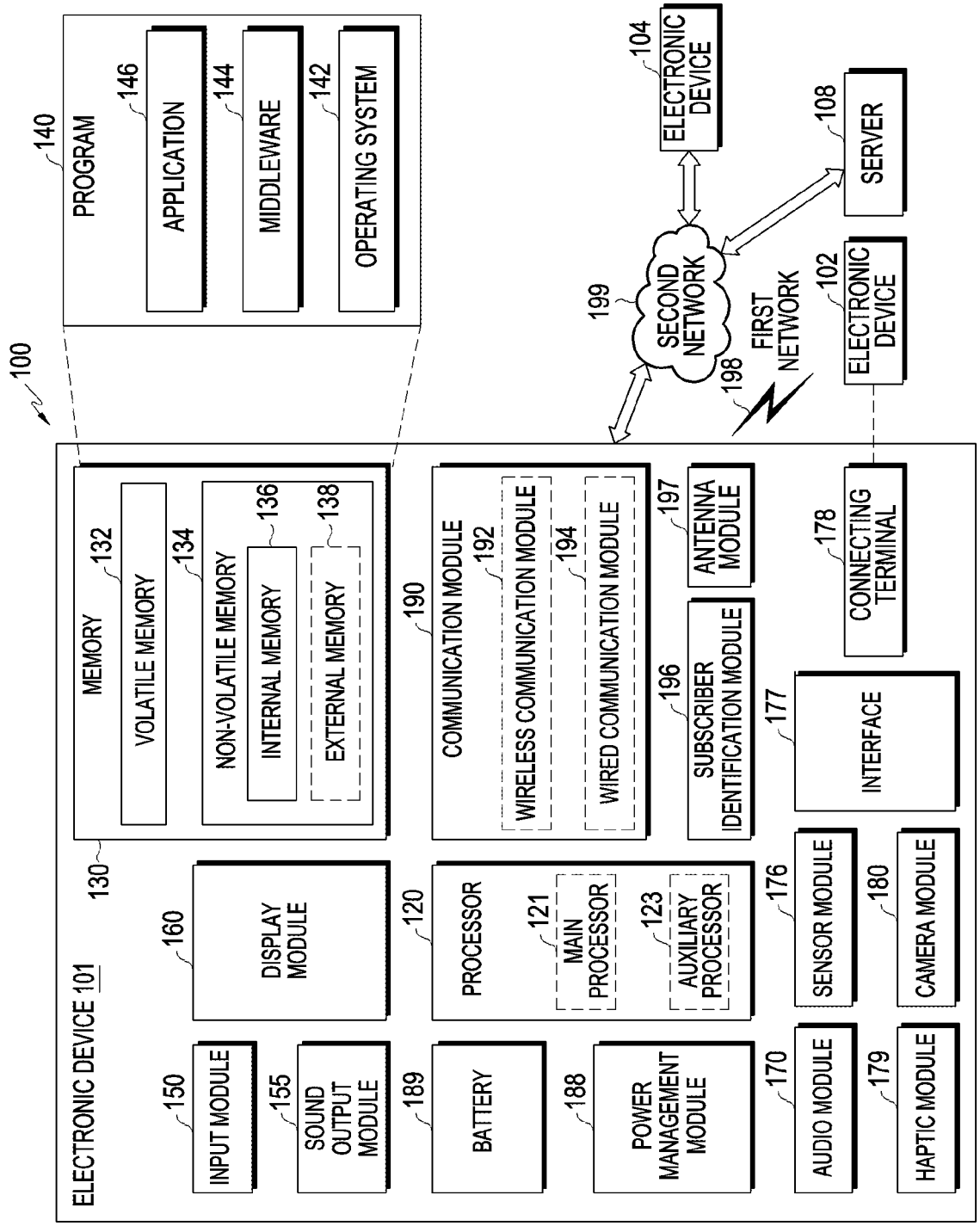
FIG. 1 is a block diagram illustrating an example electronic device in a network environment according to various embodiments.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
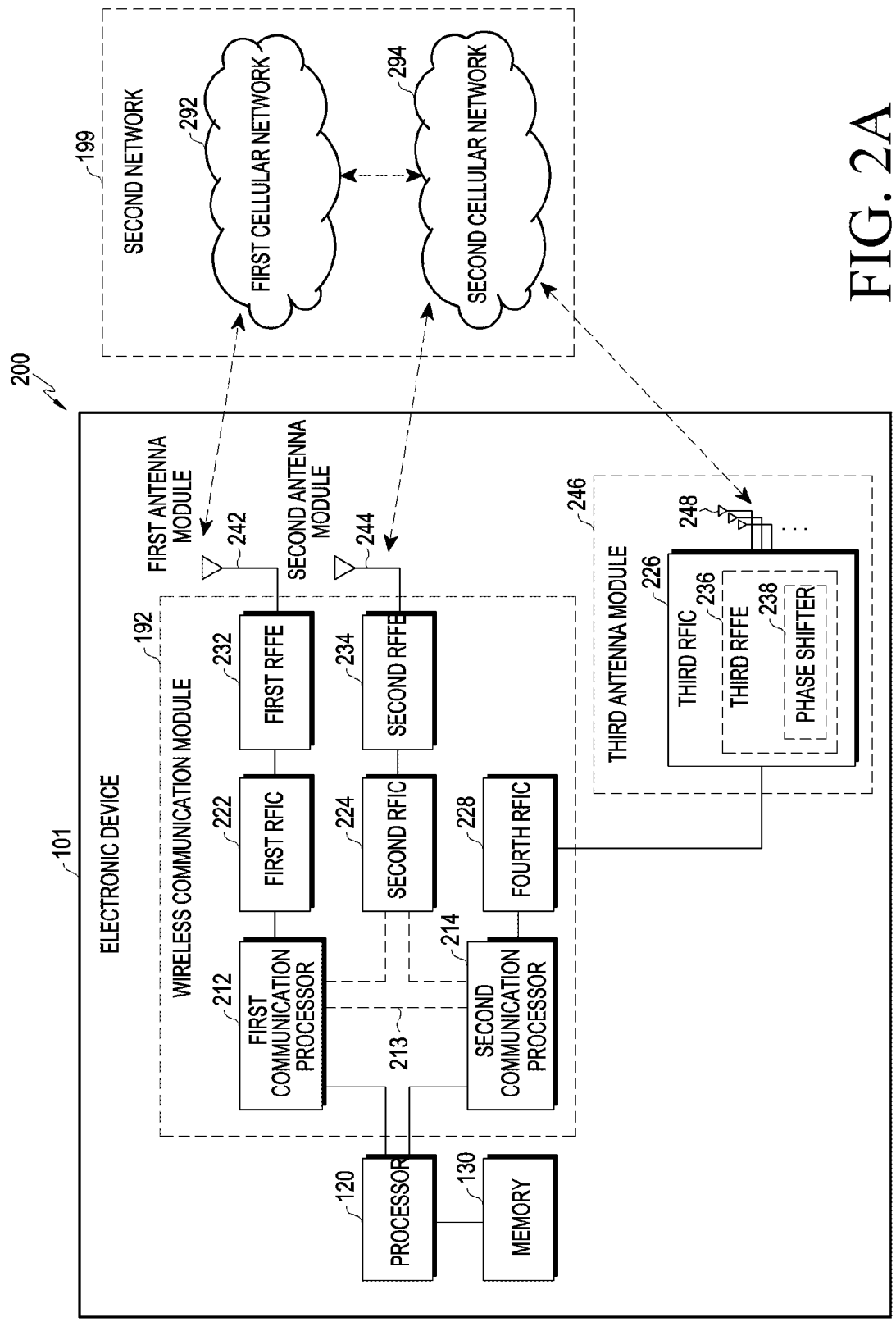
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, a third antenna module (e.g., including at least one antenna) 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and establish a communication channel of a band that is to be used for wireless communication with the first cellular network 292 or may support legacy network communication via the established communication channel. According to an embodiment, the first cellular network may be a legacy network that includes second generation (2G), third generation (3G), fourth generation (4G), or long-term evolution (LTE) networks. The second CP 214 may include various processing circuitry and establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
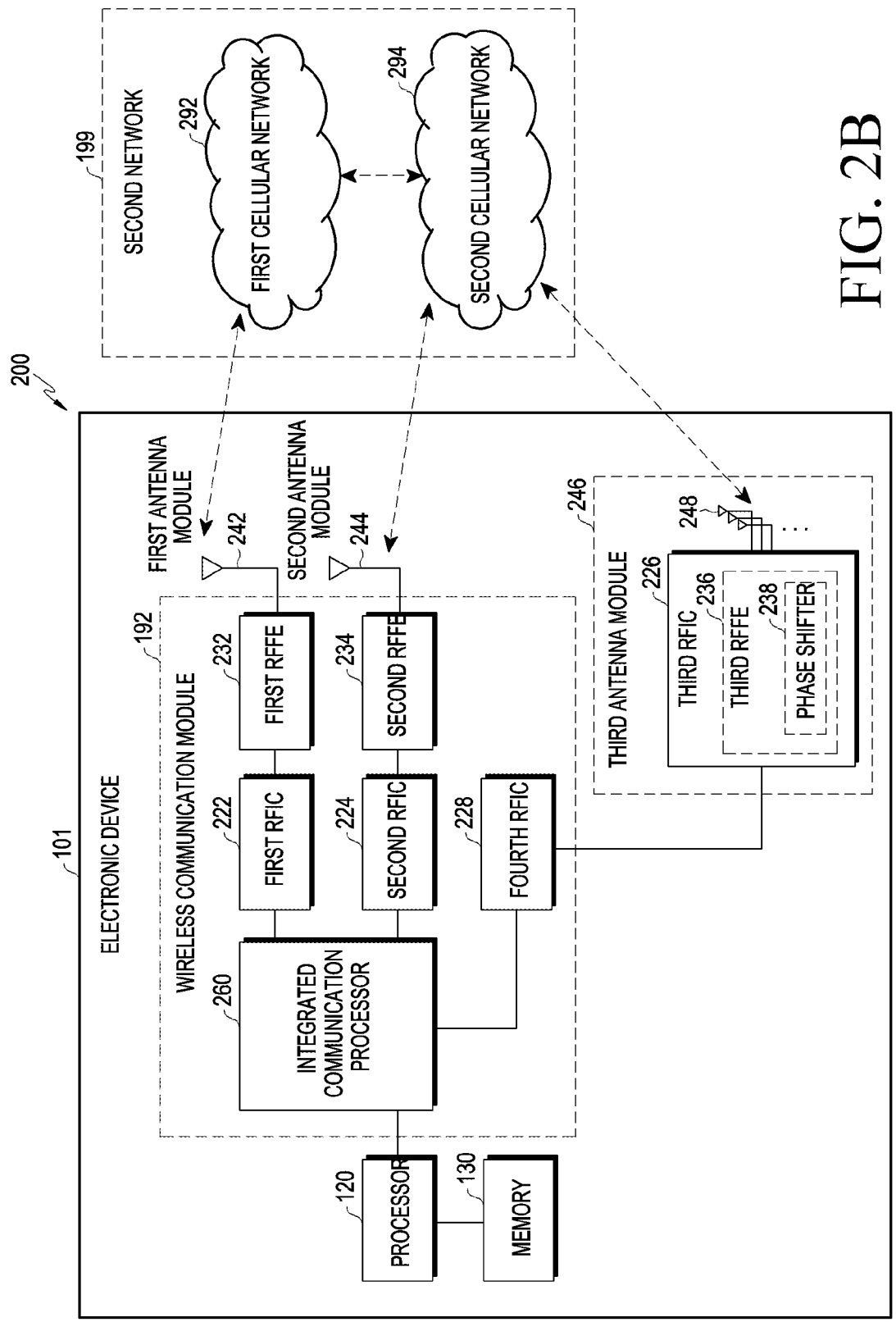
FIG. 2B is a block diagram illustrating an example configuration of an electronic device for supporting legacy network communication and 5G network communication according to various embodiments.

According to an embodiment, the first communication processor 212 and the second communication processor 214 may be implemented in a single chip or a single package. According to an embodiment, the first CP 212 or the second CP 214, along with the processor 120, an assistance processor 123, or communication module 190, may be formed in a single chip or single package. For example, as shown in FIG. 2B, a communication processor (e.g., including processing circuitry) 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE, (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to an embodiment, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
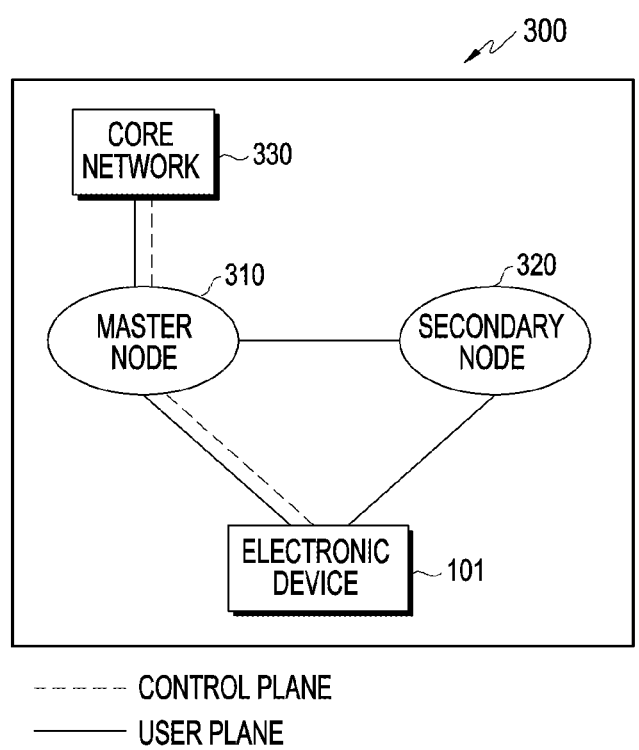
FIG. 3 is a diagram illustrating wireless communication systems providing a legacy communication network and/or a 5G communication network according to various embodiments.

FIG. 3 is a diagram illustrating wireless communication systems providing a legacy communication network and/or a 5G communication network according to various embodiments. Referring to FIG. 3, the network environment 300 may include at least one of a legacy network and a 5G network. The legacy network may include, e.g., a 3GPP-standard 4G or LTE base station (e.g., an eNodeB (eNB)) that supports radio access with the electronic device 101 and an evolved packet core (EPC) that manages 4G communication. The 5G network may include, e.g., a new radio (NR) base station (e.g., a gNodeB (gNB)) that supports radio access with the electronic device 101 and a 5th generation core (5GC) that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may refer, for example, to user data except for control messages transmitted or received between the electronic device 101 and the core network 330 (e.g., the EPC).

Referring to FIG. 3, according to an embodiment, the electronic device 101 may transmit or receive at least one of a control message or user data to/from at least part (e.g., the NR base station or 5GC) of the 5G network via at least part (e.g., the LTE base station or EPC) of the legacy network.

According to an embodiment, the network environment 300 may include a network environment that provides wireless communication dual connectivity (DC) to the LTE base station and the NR base station and transmits or receives control messages to/from the electronic device 101 via one core network 330 of the EPC or the 5GC.

According to an embodiment, in the DC environment, one of the LTE base station or the NR base station may operate as a master node (MN) 310, and the other as a secondary node (SN) 320. The MN 310 may be connected with the core network 230 to transmit or receive control messages. The MN 310 and the SN 320 may be connected with each other via a network interface to transmit or receive messages related to radio resource (e.g., communication channel) management therebetween.

According to an embodiment, the MN 310 may include an LTE base station, the SN may include the NR base station, and the core network 330 may include the EPC. For example, control messages may be transmitted/received via the LTE base station and the EPC, and user data may be transmitted/received at least one of the LTE base station or the NR base station.

According to an embodiment, the MN 310 may include the NR base station, the SN 320 may include the LTE base station, and the core network 330 may include the 5GC. For example, control messages may be transmitted/received via the NR base station and the 5GC, and user data may be transmitted/received at least one of the LTE base station or the NR base station.

According to an embodiment, the electronic device 101 may be registered in at least one of the EPC or the 5GC to transmit or receive control messages.

According to an embodiment, the EPC or the 5GC may interwork with each other to manage communication for the electronic device 101. For example, mobility information for the electronic device 101 may be transmitted or received via the interface between the EPC and the 5GC.

As described above, dual connectivity through the LTE base station and the NR base station may be named EN-DC. Besides the EN-DC, the MR DC may have other various applications. For example, a first network and a second network by the MR DC may be both related to LTE communication, and the second network may be a network corresponding to a small cell of a specific frequency. For example, the first network and the second network by the MR DC may be both related to 5G, and the first network may correspond to a frequency band (e.g., below 6) less than 6 GHz, and the second network may correspond to a frequency band (e.g., over 6) not less than 6 GHz. It will be easily appreciated by one of ordinary skill in the art that other various dual-connectivity-applicable network structures may be applied to embodiments of the disclosure.

Figure 4:
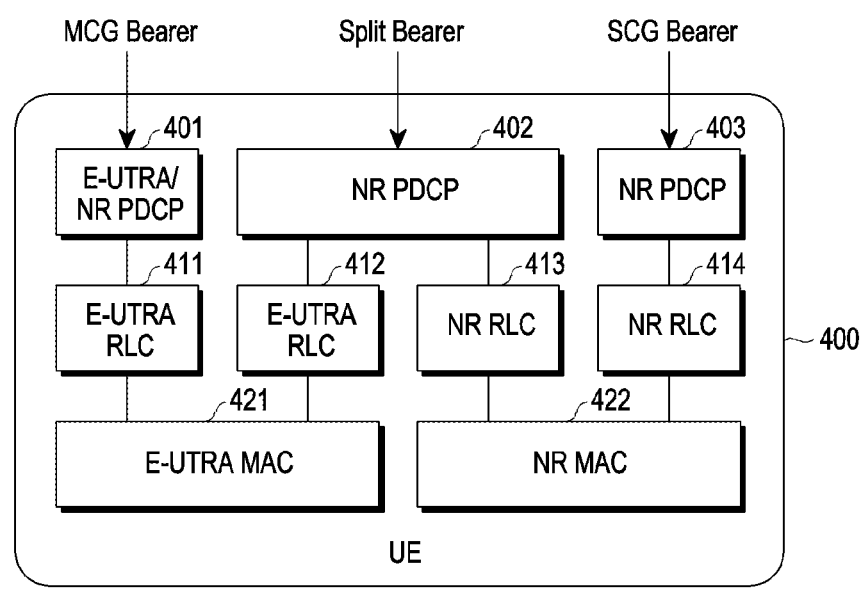
FIG. 4 is a block diagram illustrating an example configuration of a bearer in a UE according to various embodiments.

FIG. 4 is a block diagram illustrating a bearer in a UE according to various embodiments.

Bearers possible in the 5G non-standalone network environment (e.g., the network environment 300a of FIG. 3) may include a master cell group (MCG) bearer, a secondary cell group (SCG) bearer, and a split bearer. An E-UTRA/NR (packet data convergence protocol) PDCP entity 401 and NR PDCP entities 402 and 430 may be configured in a user equipment (UE) 400. E-UTRA radio link control (RLC) entities 411 and 412 and NR RLC entities 413 and 414 may be configured in the UE 400. An E-UTRA MAC entity 421 and an NR MAC entity 422 may be configured in the UE 400. The UE may be a user device capable of communicating with base stations, and the UE may be interchangeably used with the electronic device 101 of FIG. 1. For example, when the UE performs a specific operation according to an embodiment, this may refer, for example, to at least one component of the electronic device 101 performing the specific operation.

The MCG may correspond to, e.g., the master node (MN) 310 of FIG. 3, and the SCG may correspond to the secondary node (SN) 320 of FIG. 3. The UE 400, if a node for communication is determined, may configure various entities as shown in FIG. 4 for communication with the determined node (e.g., a base station). The PDCP layer entities 401, 402, and 403 may receive data (e.g., PDCP SDU corresponding to IP packet) and output converted data (e.g., PDCP protocol data unit (PDU)) to which additional information (e.g., header information) has been applied. RLC layer entities 411, 412, 413, and 414 may receive the converted data (e.g., PDCP PDU) from the PDCP layer entities 401, 402, and 403 and output converted data (e.g., RLC PDU) to which additional information (e.g., header information) has been applied. MAC layer entities 421 and 422 may receive the converted data (e.g., RLC PDU) from the RLC layer entities 411, 412, 413, and 414 and output converted data (e.g., MAC PDU) to which additional information (e.g., header information) has been applied and transfer to the physical layer (not shown).

The MCG bearer may be associated with a path (or data) through which data may be transmitted/received only using the entity or resources corresponding to the MN in dual connectivity. The SCG bearer may be associated with a path (or data) through which data may be transmitted/received only using the entity or resources corresponding to the SN in dual connectivity. The split bearer may be associated with a path (or data) through which data may be transmitted/received using the entity or resources corresponding to the MN and the entity or resources corresponding to the SN in dual connectivity. Thus, as shown in FIG. 4, the split bearer may be associated with all of the E-UTRA RLC entity 412 and the NR RLC entity 413 and the E-UTRA MAC entity 421 and NR MAC entity 422 via the NR PDCP entity 402.

Figure 5:
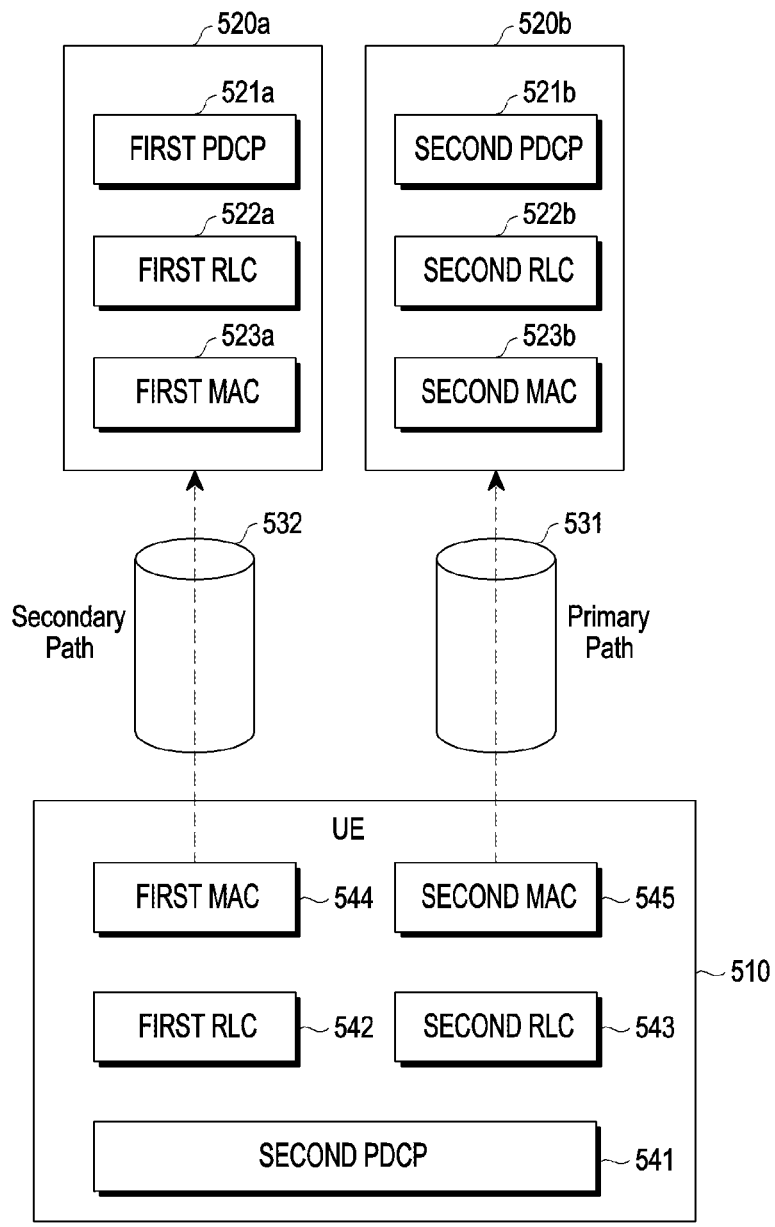
FIG. 5 is a diagram illustrating an uplink path between a UE and base stations according to various embodiments.

FIG. 5 is a diagram illustrating an uplink path between a UE and base stations according to various embodiments.

According to an embodiment, a UE 510 (e.g., the electronic device 101) may perform communication with base stations 520a and 520b based on a split bearer in FIG. 5. Accordingly, the transmission data (e.g., IP packet) to be transmitted from the UE 510 to the base stations 520a and 520b may be transferred through a second PDCP entity 541 to a second RLC entity 543 and a second MAC entity 545 or a first RLC entity 542 and a first MAC entity 544. For example, the first RLC entity 542 and the first MAC entity 544 may be associated with a first network. The second RLC entity 543 and the second MAC entity 545 may be associated with a second network. The first BS 520a may configure a first PDCP entity 521a, a first RLC entity 522a, and a first MAC entity 523a. The second BS 520b may configure a second PDCP entity 521b, a second RLC entity 522b, and a second MAC entity 523b. A path associated with the second RCL entity 543 and the second MAC entity 545 of the UE 510 may be a primary path 531, and a path associated with the first RLC entity 542 and the first MAC entity 514 may be a secondary path 532. Here, the first PDCP entity 521a may be implemented identically to the second PDCP entity 521b. For example, for implementation of EN-DC, when the BS 520*a* is an LTE BS, the first PDCP entity 521*a* may be configured as an NR PDCP entity. In an embodiment, a specific PDCP entity (e.g., NR PDCP entity) may reside in the BS 520*a* or the BS 520*b*. When a split bearer is configured, at least one of the first PDCP entity 521*a* or the second PDCP entity 521*b* may transmit data to the core network. In an embodiment, either the first PDCP entity 521*a* or the second PDCP entity 521*b* may not exist. The BS 520*a* and the BS 520*b* may communicate directly with each other.

The first network and the second network are not limited as long as they are networks capable of dual connectivity. For example, each of the first network and the second network may correspond to each of LTE communication and NR communication. For example, the first network and the second network may be both related to LTE communication, and the second network may be a network corresponding to a small cell of a specific frequency. For example, the first network and the second network may be both related to 5G, and the first network may correspond to a frequency band (e.g., below 6) less than 6 GHz, and the second network may correspond to a frequency band (e.g., over 6) not less than 6 GHz.

According to an embodiment, the UE 510 may transmit transmission data to the BSs 520*a* and 520*b* using at least one of the first network and the second network based on the split bearer. According to an embodiment, the UE 510 may configure the second network associated with the second BS 520*b* corresponding to the SCG as a primary path 531 and may configure the first network associated with the first BS 520*a* corresponding to the MCG as a secondary path 532. For example, the UE 510 may configure the second network associated with the SCG as the primary path 531 based on information indicating the primary path received from the MN. Information indicating the primary path received from the MN may be included in an RRC message (e.g., an RRCReconfiguration message) and received. In an embodiment, a scheme in which the UE 510 configures a primary path is not limited. The primary path may be determined, e.g., based on the policy of each communication carrier. The UE 510 may receive the information indicating the primary path and identify the primary path. The primary path may indicate the cell group ID and LCID of a primary RLC entity for uplink data transmission when a PDCP entity is associated with more than one RLC entity. The second PDCP entity 521*b* may be included in the base station 520*a* having a primary path. According to an embodiment, the first PDCP entity 521*a* may be included in a base station 520*b* having a secondary path.

In an embodiment, the UE 510 may identify information about an uplink split threshold. The UE 510 may receive and identify the information about the uplink split threshold from the MN. The information on the uplink split threshold may be included in a UE-specific or UE-dedicated RRC message (e.g., RRCReconfiguration message). According to an embodiment, there is no restriction on the scheme in which the UE 510 identifies the information about the uplink split threshold.

Table 1 below is a format of the RRCReconfiguration message, according to an embodiment.

TABLE 1

| RRCReconfiguration-IEs ::= | SEQUENCE { |
| radioBearerConfig | RadioBearerConfig |
| OPTIONAL, -- Need M | |
| | OPTIONAL, -- Need M |

TABLE 1-continued

| RadioBearerConfig ::= | SEQUENCE { |
| --- | --- |
| ... | |
| drb-ToAddModList | DRB-ToAddModList |
| OPTIONAL, -- Need N | |
| ... | |
| } | |
| DRB-ToAddModList ::= | SEQUENCE (SIZE (1..maxDRB)) OF DRB-ToAddMod |
| DRB-ToAddMod ::= | SEQUENCE { |
| ... | |
| pdcp-Config | PDCP-Config |
| OPTIONAL, | -- Cond PDCP |
| ... | |
| } | |
| PDCP-Config ::= | SEQUENCE { |
| drb | SEQUENCE { |
| ... | |
| moreThanOneRLC | SEQUENCE { |
| primaryPath | SEQUENCE { |
| cellGroup | CellGroupId |
| OPTIONAL, -- Need R | |
| logicalChannel | |
| LogicalChannelIdentity | OPTIONAL -- Need R |
| }, | |
| ul-DataSplitThreshold | UL-DataSplitThreshold |
| OPTIONAL, -- Cond SplitBearer | |
| pdcp-Duplication | ENUMERATED { true } |
| OPTIONAL -- Need R | |
| } | |

As indicated by the underline above, in the RRCReconfiguration message, ul-datasplitthreshold may be defined as the uplink split threshold.

The information about the uplink split threshold may also be determined, e.g., based on the policy of each communication carrier. The UE 510 may identify that the transmitting PDPC entity (e.g., the second PDCP entity 541) is associated with two or more RLC entities (e.g., the first RLC entity 542 and the second RLC entity 543), and the two or more RLC entities (e.g., the first RLC entity 542 and the second RLC entity 543) belong to different cell groups. In this case, the UE 510 may identify whether the total amount of PDCP data volume and RLC data volume is larger than or equal to the uplink split threshold. When the total amount of PDCP data volume and RLC data volume is larger than or equal to the uplink split threshold, the transmitting PDCP entity (e.g., the second PDCP entity 541) of the UE 510 may submit the PDCP PDU to the primary RLC entity or secondary RLC entity. If the total amount of PDCP data volume and RLC data volume is smaller than the uplink split threshold, the transmitting PDCP entity (e.g., the second PDCP entity 541) of the UE 510 may submit the PDCP PDUs only to the primary RLC entity. As described above, the UE 510 may transmit data through the primary path 531 and the secondary path 532 when the size of data to be transmitted is larger than or equal to the threshold. The UE 510 may transmit data only through the primary path 531 when the size of data to be transmitted is less than the threshold.

Figure 6:
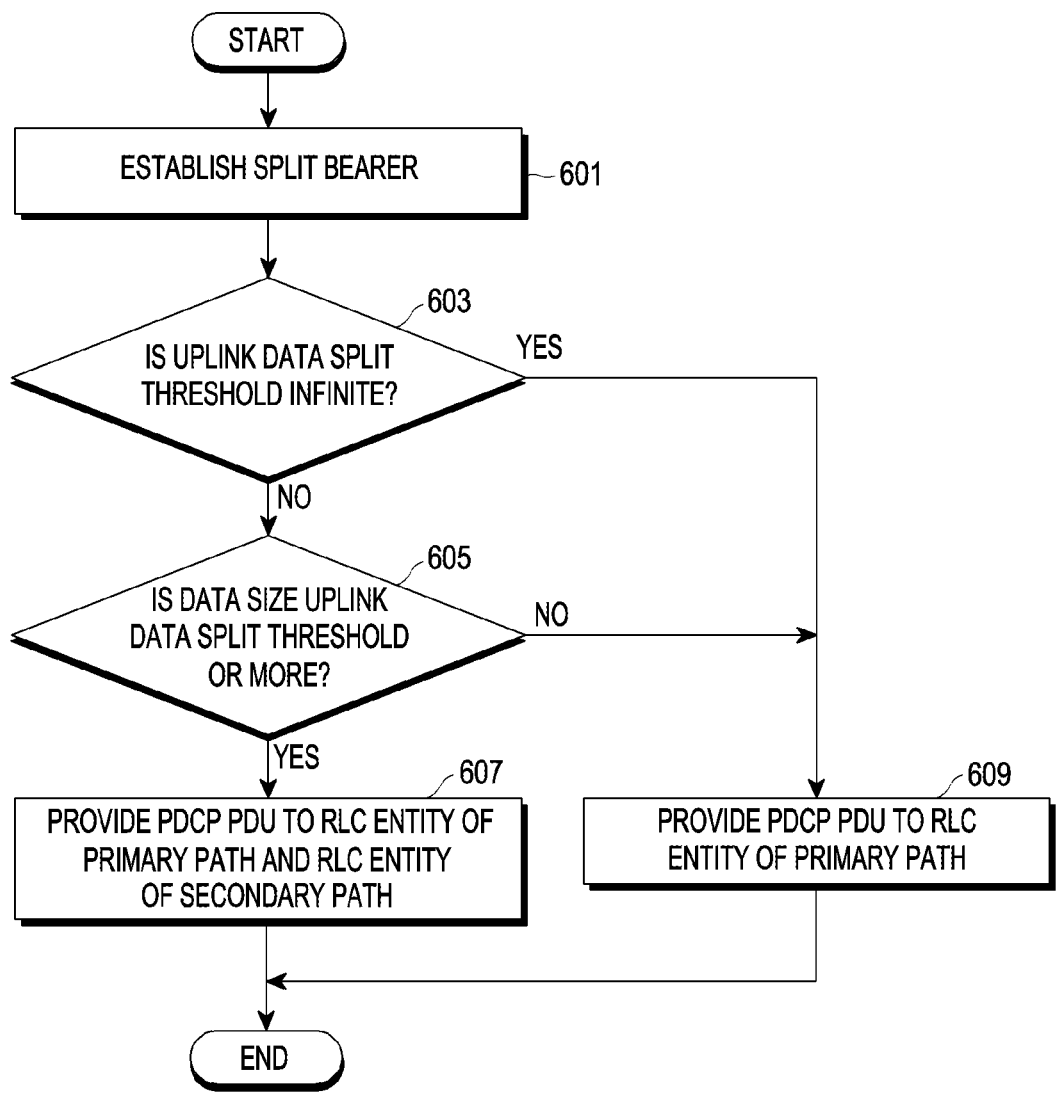
FIG. 6 is a flowchart illustrating an example method of operating an electronic device according to various embodiments.

FIG. 6 is a flowchart illustrating an example method of operating an electronic device according to various embodiments.

According to an embodiment, an electronic device 101 (e.g., at least one of the processor 120, the first communication processor 212, the second communication processor 214, or the integrated communication processor 260) may establish a split bearer in operation 601. In operation 603, the electronic device 101 may identify whether the uplink data split threshold is infinite. According to the network operator's policy, there is a case where the uplink data split threshold is set to infinity. If the uplink data split threshold is not set to infinite (no in 603), the electronic device 101 may identify whether the size of data is larger than or equal to the uplink data split threshold in operation 605. For example, the electronic device 101 may identify whether the total amount of PDCP data volume and RLC data volume is greater than or equal to the uplink split threshold. If the size of the data is equal to or greater than the uplink data split threshold (yes in 605), the electronic device 101 may provide the PDCP PDU to the RLC entity of the primary path and the RLC entity of the secondary path in operation 607. If the size of the data is less than the strict link data split threshold (no in 605), the electronic device 101 may provide the PDCP PDU only to the RLC entity of the primary path in operation 609. Or, when the uplink data split threshold is set to infinity (yes in 603), the electronic device 101 may provide the PDCP PDU only to the RLC entity of the primary path in operation 609. Meanwhile, as described above, when the PDCP PDU is provided to the RLC entity of the primary path and the RLC entity of the secondary path, uplink data may be transmitted through the primary path and may also be transmitted through the secondary path. Transmission powers of both uplink data may be set based on the respective uplink channel states of both RATs. When the uplink channel condition is relatively good, the transmission power of uplink data may be set to be relatively low. When the uplink channel condition is relatively poor, the transmission power of uplink data may be set to be relatively large. When the transmission power of uplink data is set to be relatively large, power consumption of the electronic device 101 may be relatively large and/or heat generation amount may be relatively large. According to an embodiment, when the uplink channel state of one RAT is relatively poor, and the uplink channel state of the other RAT is relatively good, the electronic device 101 may perform an uplink throttling operation on the RAT which is in the relatively poor uplink channel state. Accordingly, an increase in power consumption and/or an increase in heat generation may be mitigated.

Figure 7:
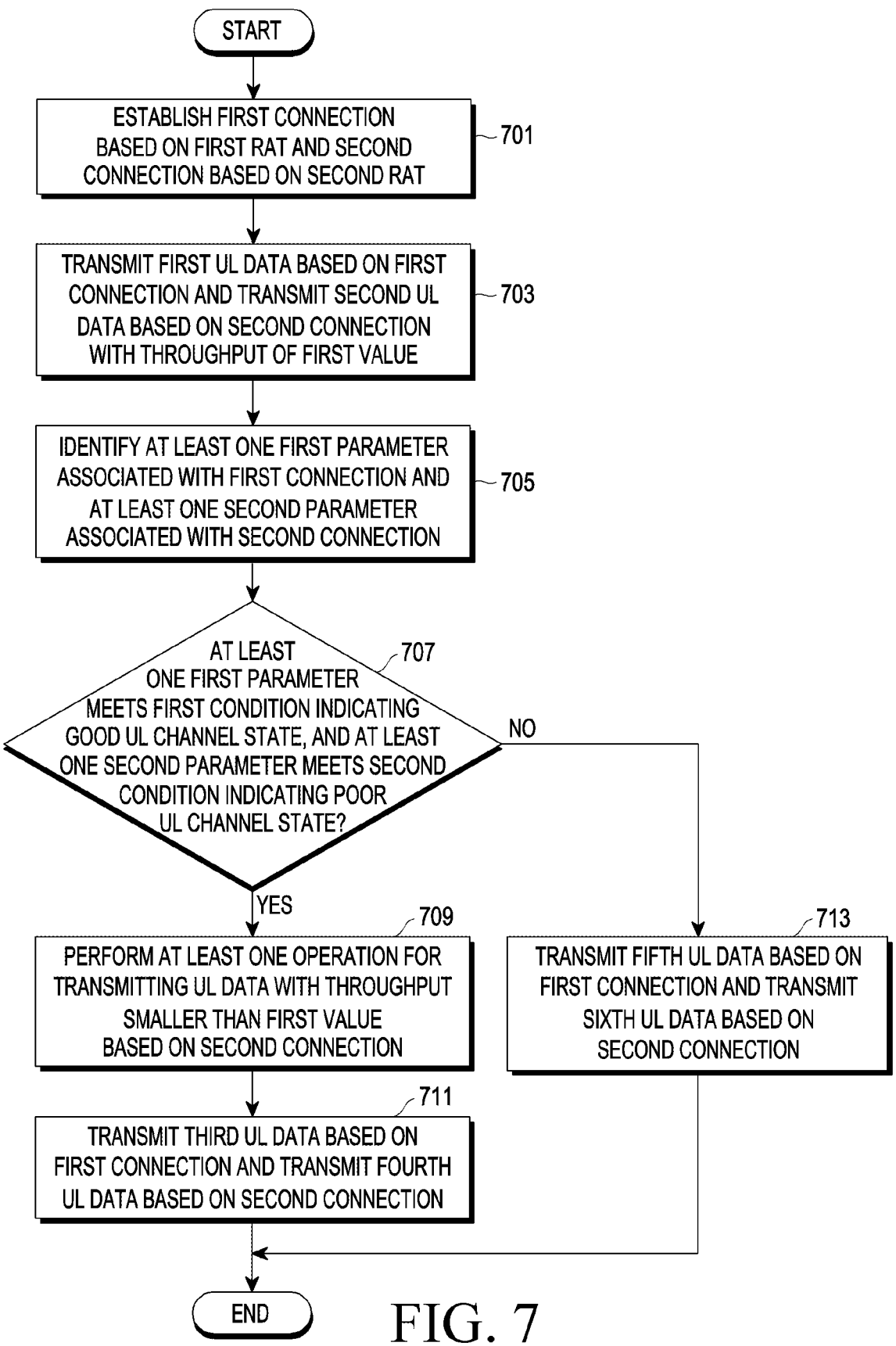
FIG. 7 is a flowchart illustrating an example method of operating an electronic device according to various embodiments.

FIG. 7 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT based on dual connectivity in operation 701. Meanwhile, dual connectivity may include E-UTRA-NR Dual Connectivity (EN-DC), NG-RAN E-UTRA-NR Dual Connectivity (NGEN-DC), NR-E-UTRA Dual Connectivity (NE-DC), or NR-NR Dual Connectivity (NR-DC). Here, the first RAT and the second RAT are not necessarily different from each other. For example, as in NR-DC, the RATs may be the same. The RAT may also be referred to as a node. For example, after establishing the first connection based on the RAT of the MCG, the electronic device 101 may receive an RRC reconfiguration message from the network corresponding to the RAT of the MCG. The electronic device 101 may perform measurement based on a measurement object (MO) of the inter-RAT included in the RRC reconfiguration message. When the measurement result meets the reporting criterion (e.g., B1 event), the electronic device 101 may perform a measurement report. The MCG network may determine whether to add an SCG based on the measurement report. When SCG addition is determined, the network of the MCG may transmit an RRC reconfiguration message of SCG addition configuration to the electronic device 101. The electronic device 101 may perform a random access (RA) procedure with the SCG network based on information included in the RRC reconfiguration message. Accordingly, a second connection with the SCG network may be established. The electronic device 101 may establish a split bearer after the first connection and the second connection based on dual connectivity are established. For example, the network may configure a split bearer in the electronic device 101 based on RRC signaling. The electronic device 101 may identify whether a split bearer is configured based on RRC signaling from the network.

According to an embodiment, in operation 703, the electronic device 101 may transmit first UL data based on the first connection and may transmit second UL data based on the second connection with a throughput of the first value. For example, the electronic device 101 may transmit UL data through both the first connection and the second connection based on the size of data to be transmitted being the uplink split threshold or more. It is assumed that the throughput of the second UL data based on the second connection of them is the first value. Those skilled in the art will understand that the throughput of the first UL data based on the first connection may be an arbitrary value and is not specified in the description of the present embodiment.

According to an embodiment, in operation 705, the electronic device 101 may identify at least one first parameter associated with the first connection and at least one second parameter associated with the second connection. Here, the first parameter and/or the second parameter are not limited as long as they are parameters capable of determining whether the uplink channel state is good or poor. In an example, the first parameter and/or the second parameter may be the received strength of the signal from the network measured by the electronic device 101. For example, since the downlink channel and the uplink channel have channel reciprocity, the received strength of the signal from the network may be used as one kind of parameter. In an example, the first parameter and/or the second parameter may be a pathloss between the electronic device 101 and the network. In an example, the first parameter and/or the second parameter may be a value obtained by adding power control adjustment state information to the pathloss between the electronic device 101 and the network. In an example, the first parameter and/or the second parameter may be an MCS index or spectral efficiency corresponding to the MCS index. It will be appreciated by one of ordinary skill in the art that other types of parameters than the above-described parameters are also available without limitations thereto.

According to an embodiment, in operation 707, the electronic device 101 may identify whether at least one first parameter meets a first condition indicating a good uplink channel state, and at least one second parameter meets a second condition indicating a poor uplink channel state. Here, the first condition may be a condition for determining that the uplink channel condition is relatively good, and various examples thereof are described below. The second condition may be a condition for determining that the uplink channel condition is relatively poor, and various examples thereof are described below. When at least one first parameter meets the first condition, and at least one second parameter meets the second condition (yes in 707), the electronic device 101 may perform at least one operation to transmit uplink data with a throughput less than the first value based on the second connection in the poor uplink channel state. At least one operation for transmitting uplink data with a smaller throughput than the existing throughput may be referred to as an uplink throttling operation for convenience of description. Or, one of ordinary skill in the art will understand that the uplink throttling operation may also refer, for example, to an operation for limiting uplink throttling to a specific value. In an example, the uplink throttling operation may include transmission of a buffer state report (BSR) with a lower value than the actual buffer state. In an example, the uplink throttling operation may include refraining from transmitting UL data in some of the resources for UL data transmission allocated from the network. Meanwhile, one of ordinary skill in the art will understand that the uplink throttling operation is not limited as long as it is an operation for transmitting uplink data with a smaller throughput than the existing throughput. In operation 711, after performing at least one operation, the electronic device 101 may transmit third UL data based on the first connection and may transmit fourth UL data based on the second connection. Here, the throughput of the second connection for which uplink throttling is performed may be less than the existing first value. Accordingly, the electronic device 101 may reduce the throughput of the second connection having a relatively poor uplink channel state. A decrease in the throughput of the second connection having a relatively poor uplink channel state may refer, for example, to a decrease in the number of transmissions of data having a relatively large transmission power. As the number of transmissions of data having a relatively large transmission power decreases, the possibility of an increase in power consumption and/or an increase in heat generation may decrease.

Meanwhile, when at least one first parameter does not meet the first condition and/or at least one second parameter does not meet the second condition (no in 707), the electronic device 101 may transmit fifth UL data based on the first connection and transmit sixth UL data based on the second connection with the throughput of the first value in operation 713. The electronic device 101 may refrain from performing the uplink throttling operation on a specific connection based on at least one first parameter failing to meet the first condition and/or at least one second parameter failing to meet the second condition. For example, when at least one second parameter for the second connection meets the second condition, e.g., if at least one first parameter for the first connection fails to meet the first condition although the uplink channel state of the second connection is relatively poor, the electronic device 101 may refrain from performing the uplink throttling operation. Meanwhile, it will be appreciated by one of ordinary skill in the art that the throughput of transmission of sixth uplink data based on the second connection being the first value as conventional is merely an example of when the electronic device 101 does not perform uplink throttling on the second connection, and the throughput may be varied depending on conditions, such as a change in channel state. Although at least one first parameter meets the first condition, e.g., even when the uplink channel state of the first connection is relatively good, if at least one second parameter fails to meet the second condition, the electronic device 101 may refrain from performing the uplink throttling operation. When at least one first parameter fails to meet the first condition, and at least one second parameter fails to meet the second condition, the electronic device 101 may refrain from performing the uplink throttling operation.

In an example, the electronic device 101 may identify that the parameter corresponding to the first connection has a first value and the parameter corresponding to the second connection has a second value. In this case, it is assumed that the first value is a value that may be identified in a relatively good channel state, and the second value is a value that may be identified in a relatively poor channel state. The electronic device 101 may identify that the first value meets the first condition, and the second value meets the second condition. The electronic device 101 may perform the uplink throttling operation on the second connection corresponding to the parameter meeting the second condition, based on meeting the first condition and the second condition. Meanwhile, in another example, the electronic device 101 may identify that the parameter corresponding to the first connection has a third value and the parameter corresponding to the second connection has a second value. In this case, it is assumed that the third value is a value that may be identified in a relatively poor channel state as compared to the first value. The electronic device 101 may identify that the first value fails to meet the first condition, and the second value meets the second condition. The electronic device 101 may refrain from performing the uplink throttling operation on the second connection corresponding to the parameter meeting the second condition, based on the first condition failing to be met, and the second condition being met.

Meanwhile, in the above description, the electronic device 101 performs an uplink throttling operation on one RAT of dual connectivity, but this is merely an example. In an embodiment, the electronic device 101 may be configured to perform an uplink throttling operation on at least one first carrier component (CC) based on the uplink channel state of at least one first CC among a plurality of CCs of carrier aggregation (CA) being poor, and the uplink channel state of at least one second CC being good. It will be appreciated by one of ordinary skill in the art that embodiments of the dual connectivity of the disclosure may be replaced with CA.

Figure 8A:
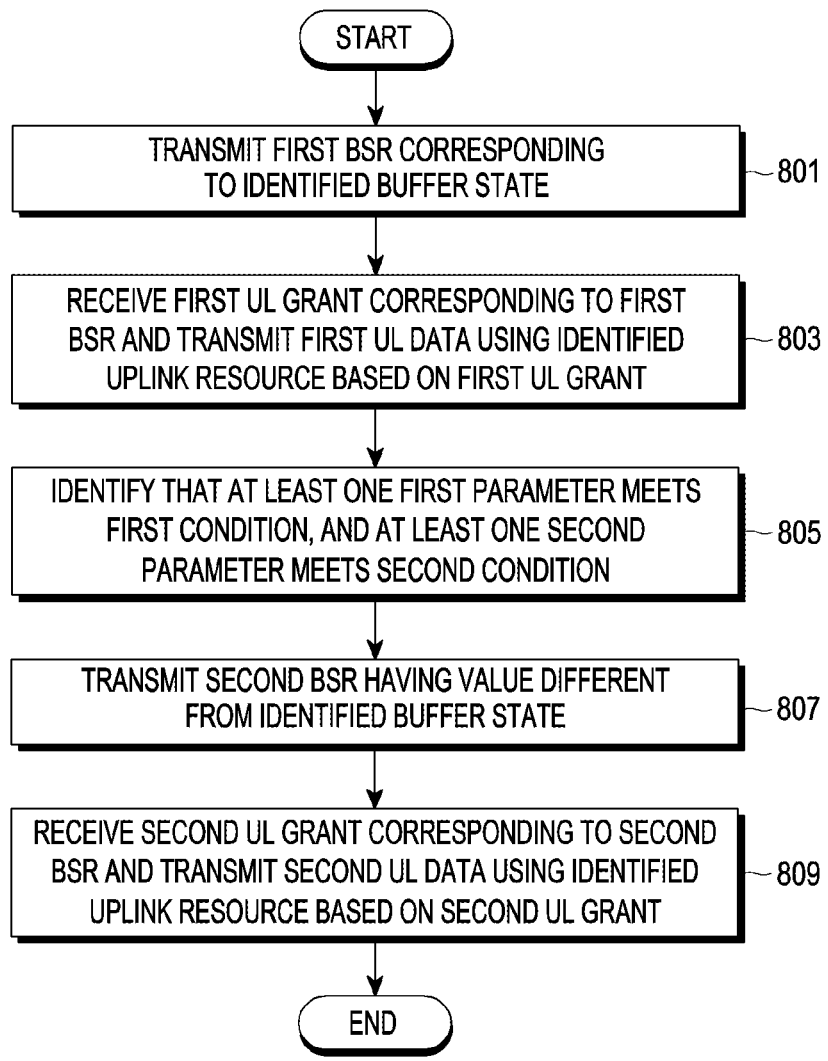
FIG. 8A is a flowchart illustrating an example method of operating an electronic device according to various embodiments.

FIG. 8A is a flowchart illustrating an example method of operating an electronic device according to various embodiments.

According to an embodiment, in operation 801, the electronic device 101 (e.g., at least one of the processor 120, the first communication processor 212, the second communication processor 214, or the integrated communication processor 260) may transmit a first BSR corresponding to an identified buffer state. In operation 803, the electronic device 101 may receive a first UL grant corresponding to the first BSR and transmit first UL data using the identified uplink resource based on the first UL grant. The network may allocate uplink resources to the electronic device 101 based on the first BSR. For example, when the buffer state of the electronic device 101 indicates that there is a relatively large amount of data, the network may allocate a relatively large number of uplink resources to the electronic device 101. When the buffer state of the electronic device 101 indicates that there is a relatively small amount of data, the network may allocate a relatively small number of uplink resources to the electronic device 101, but there is no limitation. In operation 805, the electronic device 101 may identify that at least one first parameter associated with the first connection meets the first condition, and at least one second parameter associated with the second connection meets the second condition. For example, the electronic device 101 may identify that it is required to perform an uplink throttling operation on the second connection. In operation 807, the electronic device 101 may transmit a second BSR having a value different from the identified buffer state to the network as at least part of performing the uplink throttling operation. Here, the value different from the identified buffer state is not limited as long as it is smaller than the identified buffer state. For example, the electronic device 101 may identify a designated value as the different value. For example, the electronic device 101 may identify a value corresponding to the target throughput as the different value. For example, the electronic device 101 may identify the identified buffer state value minus a designated value as the different value. For example, the electronic device 101 may identify the identified buffer state value minus a value corresponding to the identified buffer state value as the different value. For example, the electronic device 101 may identify the product of the identified buffer state value and a designated ratio as the different value. For example, the electronic device 101 may identify the product of the identified buffer state value and a ratio corresponding to the identified buffer state value as the different value. It will be appreciated by one of ordinary skill in the art that there is no limitation on the scheme for identifying the different value described above. In operation 809, the electronic device 101 may receive a second UL grant corresponding to the second BSR and transmit second UL data using the identified uplink resource based on the second UL grant. As described above, the second BSR may include a value lower than the value of the actual buffer state. Accordingly, the network may allocate uplink resources corresponding to a relatively small second connection (or second RAT) to the electronic device 101. The electronic device 101 may transmit uplink data based on the second connection using relatively few uplink resources. As the uplink channel state of the second connection is relatively poor, transmission power corresponding to uplink data based on the second connection may be relatively large. As relatively few uplink resources are allocated to the electronic device 101, the number of transmissions of uplink data with relatively large transmission power may be relatively small, so that the possibility of an increase in power consumption and/or an increase in heat generation may be reduced.

Figure 8B:
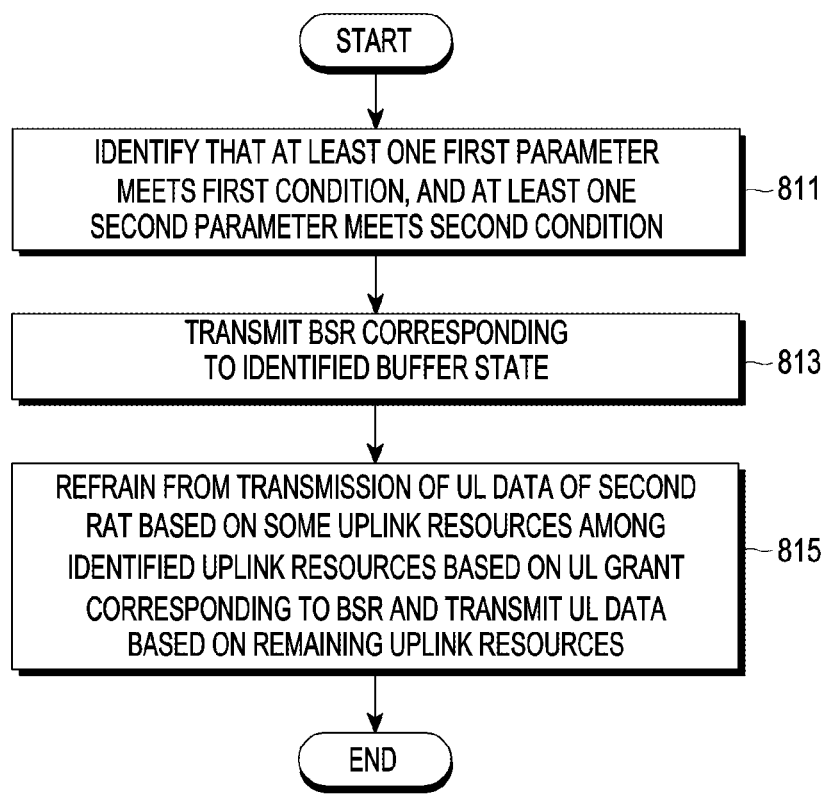
FIG. 8B is a flowchart illustrating an example method of operating an electronic device according to various embodiments.

FIG. 8B is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify that at least one first parameter meets the first condition, and at least one second parameter meets the second condition in operation 811. For example, the electronic device 101 may identify that it is required to perform an uplink throttling operation on the second connection. In operation 813, the electronic device 101 may transmit a BSR corresponding to the identified buffer state. The electronic device 101 may receive a UL grant corresponding to the BSR from the network. The network may allocate uplink resources to the electronic device 101 based on information included in the BSR. As at least part of performing the uplink throttling operation, the electronic device 101 may identify some uplink resources among the uplink resources identified based on the UL grant corresponding to the BSR as resources where uplink data is not transmitted. In operation 815, the electronic device 101 may refrain from transmission of UL data of the second RAT based on some uplink resources among the identified uplink resources based on the UL grant corresponding to the BSR and transmit UL data based on the remaining uplink resources. For example, when N uplink resources are allocated to the electronic device 101 by the network, the electronic device 101 may refrain from transmission of UL data of the second RAT based on some uplink resources among the N uplink resources and transmit UL data of the second RAT based on the remaining uplink resources. Accordingly, uplink transmission may not be performed in, e.g., some PUSCH resources. Meanwhile, transmission of UL data of the first RAT may be performed based on some uplink resources where transmission of UL data of the second RAT is refrained from. The electronic device 101 may transmit uplink data based on the second connection using relatively few uplink resources. As the uplink channel state of the second connection is relatively poor, transmission power of uplink data based on the second connection may be relatively large. As relatively few uplink resources are allocated to the electronic device 101, the number of transmissions of uplink data with relatively large transmission power may be relatively small, so that the possibility of an increase in power consumption and/or an increase in heat generation may be reduced. Meanwhile, it will be appreciated by one of ordinary skill in the art that the uplink throttling operation according to FIGS. 8A and 8B is merely an example, and any operation that reduces the throughput as compared with the existing one and/or maintains a throughput equal to or smaller than a specific target throughput may be performed as the uplink throttling operation.

Figure 9A:
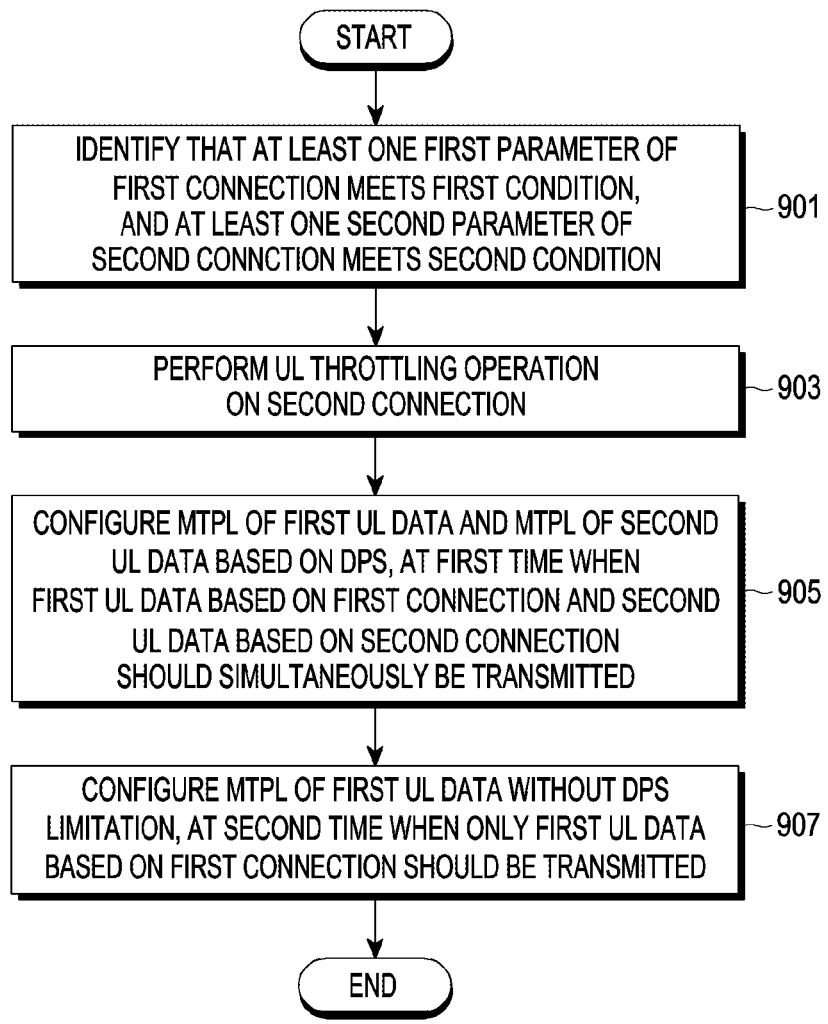
FIG. 9A is a flowchart illustrating an example method of operating an electronic device according to various embodiments.
Figure 9B:
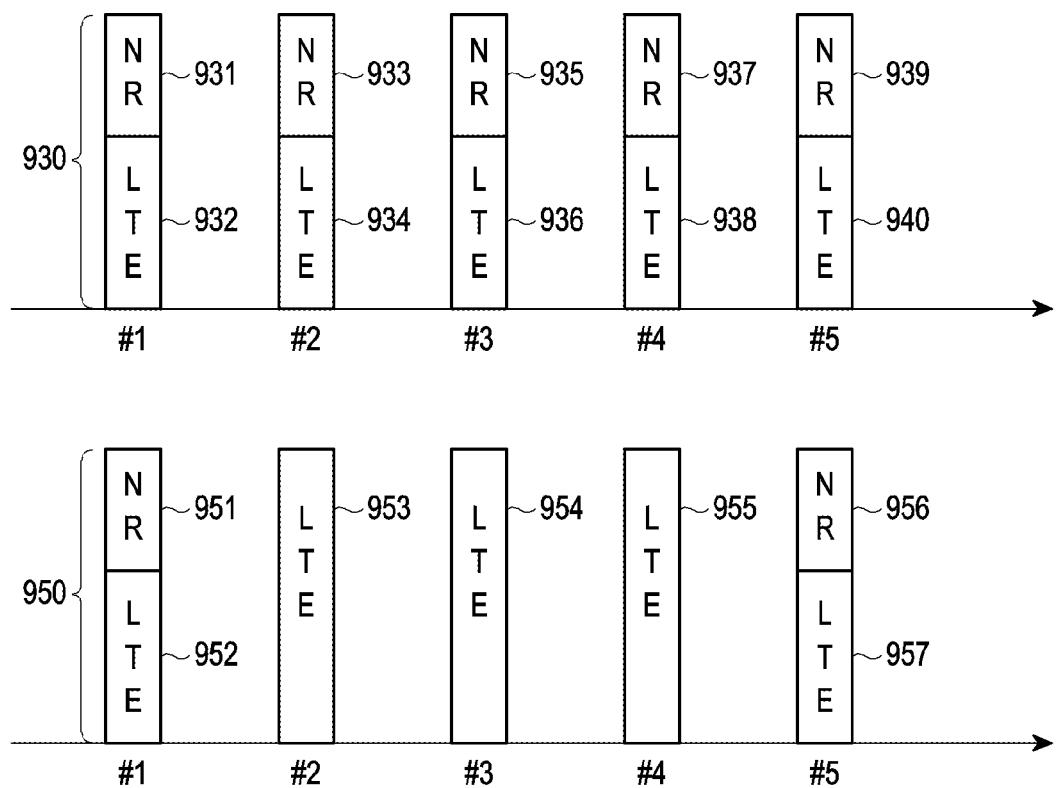
FIG. 9B is a diagram illustrating a maximum transmission power level (MTPL) of uplink data of two RATs according to various embodiments.

FIG. 9A is a flowchart illustrating an example method of operating an electronic device according to various embodiments. FIG. 9A is described with reference to FIG. 9B. FIG. 9B is a diagram illustrating a maximum transmission power level (MTPL) corresponding to uplink data of two RATs according to various embodiments.

According to an embodiment, the electronic device 101 (e.g., at least one of the processor 120, the first communication processor 212, the second communication processor 214, or the integrated communication processor 260) may identify that at least one first parameter associated with the first connection meets the first condition, and at least one second parameter associated with the second connection meets the second condition in operation 901. For example, the electronic device 101 may identify that it is required to perform an uplink throttling operation on the second connection. In operation 903, the electronic device 101 may perform a uplink throttling operation on the second connection. As described above, there are no limitations on examples of UL throttling operations. In operation 905, the electronic device 101 may configure an MTPL of first uplink data and an MTPL of second uplink data based on the DPS, at a first time when the first uplink data based on the first connection and the second uplink data based on the second connection should simultaneously be transmitted. In operation 907, the electronic device 101 may configure an MTPL of first uplink data without DPS limitations at a second time when only the first uplink data based on the first connection should be transmitted. For example, the upper side of FIG. 9B illustrates per-RAT MTPLs at times (e.g., slots) when the electronic device 101 does not perform uplink throttling on the second connection. The lower side of FIG. 9B illustrates per-RAT MTPLs at times (e.g., slots) when the electronic device 101 does not perform uplink throttling on the second connection.

Referring to the upper side of FIG. 9B, the electronic device 101 may be allocated uplink resources of times #1, #2, #3, #4, and #5. The electronic device 101 may transmit uplink data of both RATs at times #1, #2, #3, #4, and #5. When the uplink data of both RATs are simultaneously transmitted, the MTPL for each RAT may be determined based on dynamic power sharing (DSP). For example, a limit on the sum of transmission powers of uplink data based on both RATs may be set to the DPS maximum transmission power 930. The DPS maximum transmission power 930 may be allocated to each of both RATs (e.g., LTE (or E-UTRA) and NR). For example, for each time #1, #2, #3, #4, and #5, the MTPLs 931, 933, 935, 937, and 939 for NR and the MTPLs 932, 934, 936, 938, and 940 for LTE may be divided within the limit of the DPS maximum transmission power 930. Meanwhile, referring to the embodiment of the lower side of FIG. 9B, the electronic device 101 may be allocated uplink resources of times #1, #2, #3, #4, and #5. The electronic device 101 may determine to perform an uplink throttling operation on the second connection (e.g., NR-based connection. However, this is merely an example, and an LTE (or E-UTRA)-based connection may be the second connection). The electronic device 101 may refrain from uplink data transmission based on the second RAT at some times #2, #3, and #4 among times #1, #2, #3, #4, and #5 corresponding to uplink resources and transmit uplink data based on the second RAT at the remaining times #1 and #5. At the remaining times #1 and #5, the MTPLs 951 and 956 for NR and the MTPLs 952 and 957 for LTE may be divided within the limit of the maximum DPS transmission power 950. Meanwhile, at some times #2, #3, and #4, the DPS maximum transmission power 950 may be allocated as the MTPLs 953, 954, and 955 for LTE. Meanwhile, it will be appreciated by one of ordinary skill in the art that the MTPLs 953, 954, and 955 of LTE in FIG. 9B being equal to the DPS maximum transmission power 950 is merely an example, and the MTPLs 953, 954, and 955 of LTE may be set to be smaller than the maximum DPS transmission power 950. As described above, as the MTPL of the uplink data may not be limited by the DPS at the time when uplink data based on one RAT is transmitted based on uplink throttling, the transmission power of uplink data may be set to be relatively large. It will be appreciated by one of ordinary skill in the art that the embodiment described with reference to FIGS. 9A and 9B may be performed, e.g., when the remaining battery power of the electronic device 101 is a preset threshold or more and/or the temperature is not in an overtemperature state, but this is merely an example, and it may be performed without any additional condition.

Figure 10:
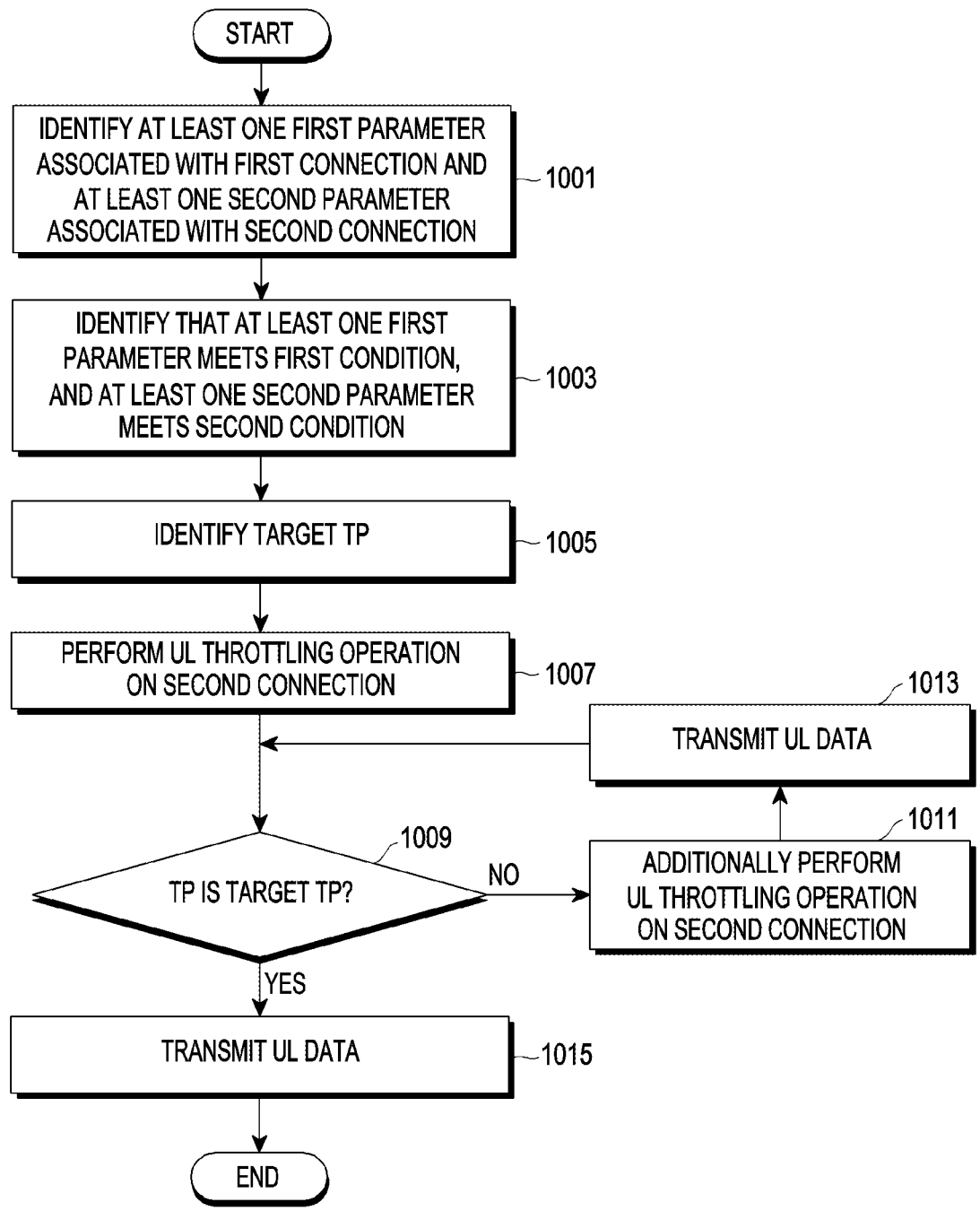
FIG. 10 is a flowchart illustrating an example method for operating an electronic device according to various embodiments.

FIG. 10 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify at least one first parameter associated with the first connection and at least one second parameter associated with the second connection in operation 1001. In operation 1003, the electronic device 101 may identify that at least one first parameter meets the first condition, and at least one second parameter meets the second condition. The electronic device 101 may determine to perform an uplink throttling operation on the second connection and, in operation 1005, identify the target throughput (TP). In operation 1007, the electronic device 101 may perform a uplink throttling operation on the second connection. As described above, there are no limitations on examples of uplink throttling operations on the second connection. After performing the uplink throttling operation, the electronic device 101 may identify whether the identified throughput is the target throughput (or the identified throughput is the target throughput or less, or the difference between the target throughput and the identified throughput is a threshold difference or less) in operation 1009. When the identified throughput is not the target throughput (no in 1009) (or the identified throughput exceeds the target throughput or the difference between the target throughput and the identified throughput exceeds the threshold difference), the electronic device 101 may additionally perform an uplink throttling operation on the second connection in operation 1011. In operation 1013, the electronic device 101 may transmit uplink data. For example, upon performing uplink throttling by adjusting information in the BSR, the electronic device 101 may further adjust the information in the BSR based on the identified throughput being not the target throughput. For example, upon performing uplink throttling based on determining that some of the allocated uplink resources are not used for uplink data transmission, the electronic device 101 may refrain from uplink data transmission in more uplink resources than the existing ones, based on the identified throughput being not the target throughput. When the identified throughput is the target throughput (yes in 1009) (or the identified throughput is the target throughput or less, or the difference between the target throughput and the identified throughput is the threshold difference or less), the electronic device 101 may transmit uplink data without additional uplink throttling (or while maintaining the existing uplink throttling operation) in operation 1015. According to the above description, the electronic device 101 may additionally (or repetitively) perform the operations for the uplink throughput until the identified throughput becomes the target throughput set corresponding to the uplink throughput.

Figure 11:
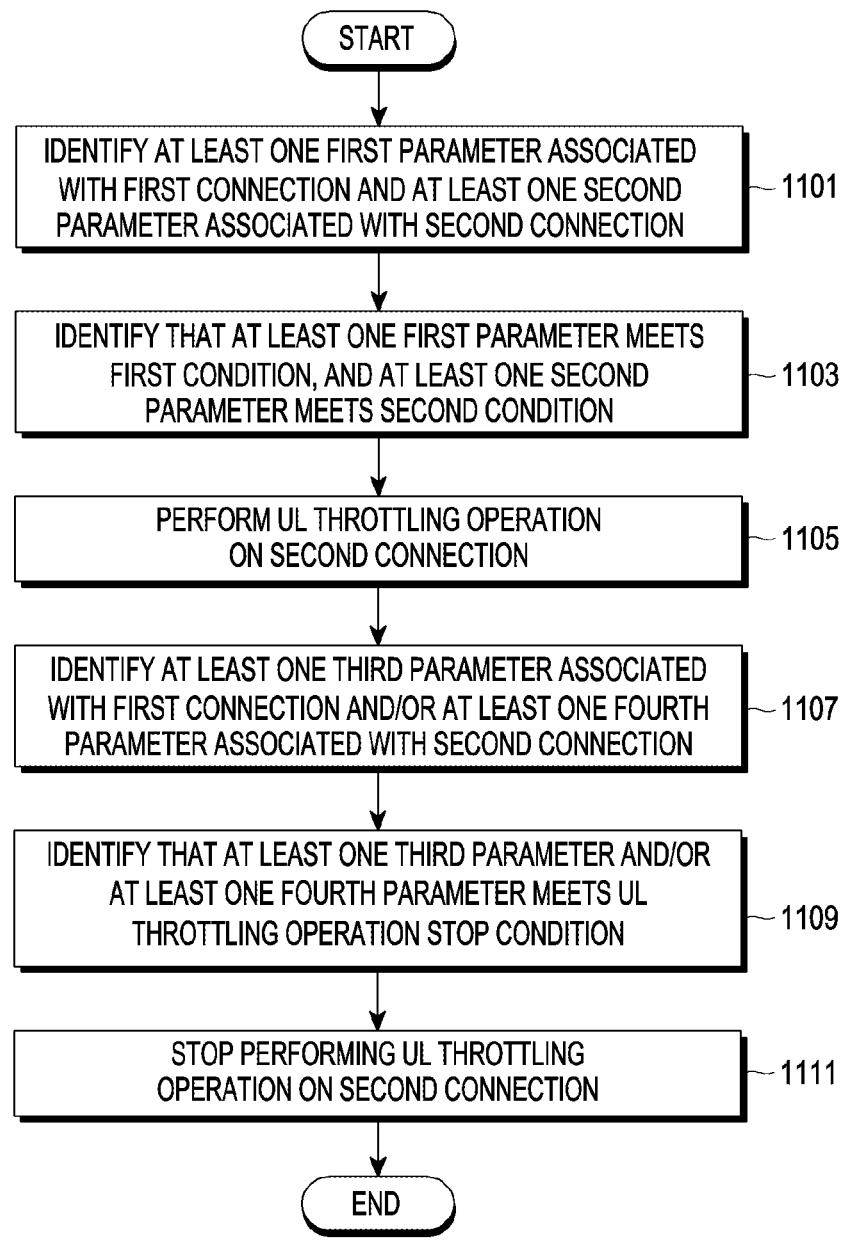
FIG. 11 is a flowchart illustrating an example method of operating an electronic device according to various embodiments.

FIG. 11 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify at least one first parameter associated with the first connection and at least one second parameter associated with the second connection in operation 1101. In operation 1103, the electronic device 101 may identify that at least one first parameter meets the first condition, and at least one second parameter meets the second condition. In operation 1105, the electronic device 101 may perform an uplink throttling operation on the second connection based on meeting the first condition and the second condition. After performing the uplink throttling operation, the electronic device 101 may identify at least one third parameter associated with the first connection and/or at least one fourth parameter associated with the second connection in operation 1107. In operation 1109, the electronic device 101 may identify that at least one third parameter and/or at least one fourth parameter meets an uplink throttling operation stop condition. In operation 1111, the electronic device 101 may stop performing the uplink throttling operation on the second connection based on meeting the uplink throttling operation stop condition. For example, when uplink throttling is performed based on transmission of a BSR having a different value from the identified buffer state, the electronic device 101 may transmit the BSR corresponding to the identified buffer state. For example, when uplink throttling is performed based on determining not to use some resources among the allocated uplink resources in uplink data, the electronic device 101 may transmit uplink data based on the allocated uplink resources.

In an example, the uplink throttling operation stop condition may be set as a condition indicating escaping from the poor uplink channel state of the second connection. For example, the second condition set for the second connection for the uplink throttling operation may be set based on a result of comparison between at least one second parameter and the threshold indicating the poor state. In this case, the uplink throttling operation stop condition may be set based on a result of comparison between at least one fourth parameter and a value produced by applying a hysteresis offset to the threshold indicating the poor state. Various examples associated with the value produced by applying the hysteresis offset to the threshold indicating the poor state are described below. Meanwhile, application of the hysteresis offset is merely an example. In another example, the uplink throttling operation stop condition may also be set based on a result of comparison between the threshold indicating the poor state and at least one fourth parameter.

In another example, the uplink throttling operation stop condition may also be set as the uplink channel state of the other RAT where the uplink throttling operation is not performed failing to remain good, and/or the difference between the parameters connected to both the connections being less than a threshold difference. For example, the first condition set for the first connection for the uplink throttling operation may be set based on a result of comparison between at least one second parameter and the threshold indicating the good state. In this case, the uplink throttling operation stop condition may be set based on a result of comparison between at least one third parameter and a value produced by applying a hysteresis offset to the threshold indicating the good state. Various examples associated with the value produced by applying the hysteresis offset to the threshold indicating the good state are described below. Meanwhile, application of the hysteresis offset is merely an example. In another example, the uplink throttling operation stop condition may also be set based on a result of comparison between the threshold indicating the good state and at least one third parameter.

Figure 12:
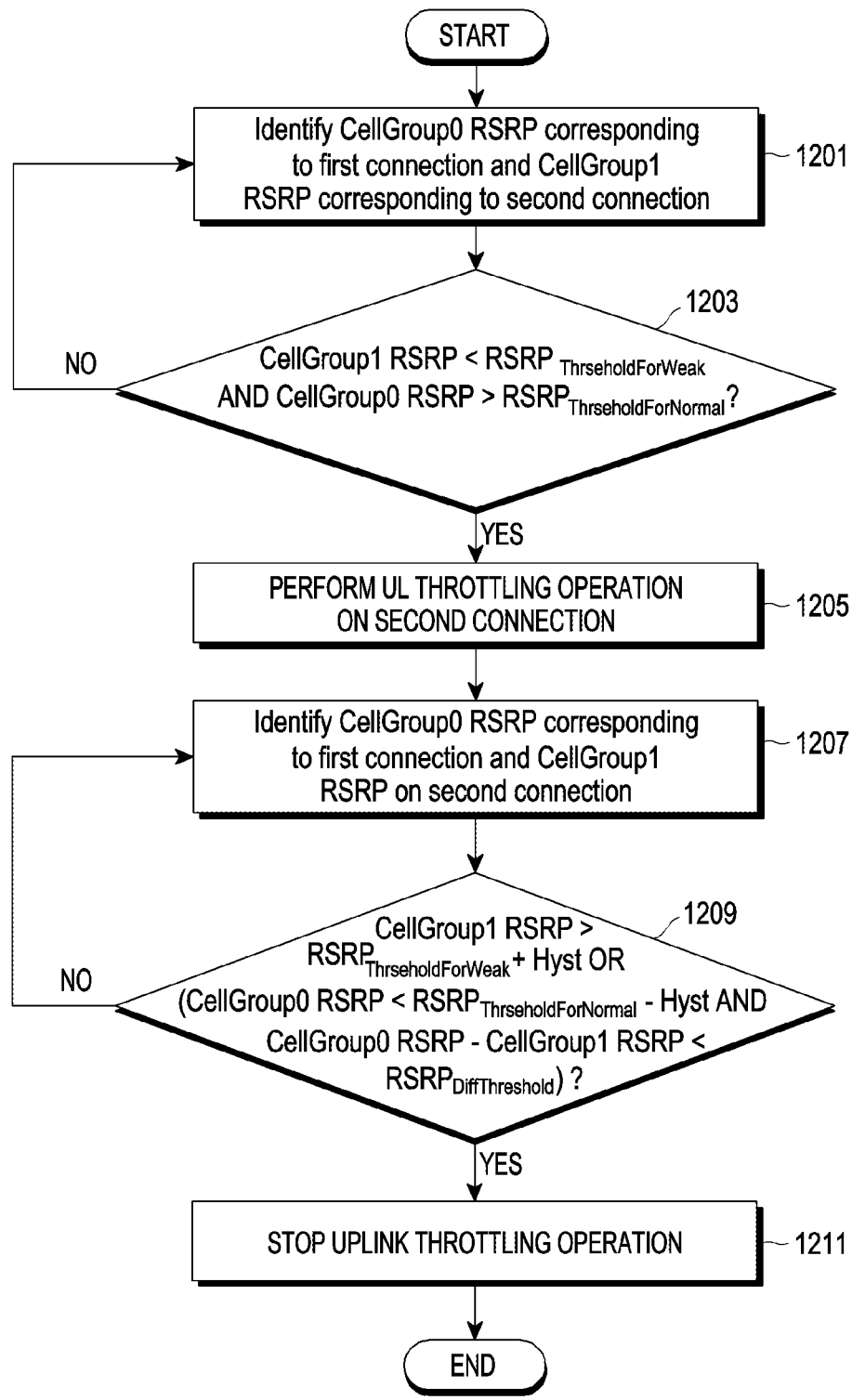
FIG. 12 is a flowchart illustrating an example method of operating an electronic device according to various embodiments.

FIG. 12 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify CellGroup0 RSRP corresponding to the first connection and CellGroup1 RSRP corresponding to the second connection in operation 1201. Meanwhile, it will be appreciated by one of ordinary skill in the art that the reference signal received power (RSRP) is merely an example of received power, and other parameters (e.g., reference signal received quality (RSRQ) or received signal strength indicator (RSSI)) capable of indicating the received strength may be added or may replace the RSRP. In operation 1203, the electronic device 101 may identify whether CellGroup0 RSRP exceeds $RSRP_{ThresholdForNormal}$ which is a first threshold indicating that the uplink channel state is good, as whether the first connection is met, and identify whether CellGroup1 RSRP is less than $RSRP_{ThresholdForWeak}$ which is a threshold indicating that the uplink channel state is poor, as the second condition is met. A condition for performing the uplink throttling operation may be expressed as Equation 1.

$$\text{CellGroup1 RSRP} < RSRP_{ThresholdForWeak} \text{ AND CellGroup0 RSRP} > RSRP_{ThresholdForNormal}? \quad \text{[Equation 1]}$$

Here, $RSRP_{ThresholdForNormal}$ which is the threshold indicating that the uplink channel state is good may be a value different from $RSRP_{ThresholdForWeak}$ which is the threshold indicating that the uplink channel state is poor, but they may be set to be the same according to implementation. If the first condition is not met and/or the second condition is not met (no in 1203), the electronic device 101 may maintain identification of both RSRPs without performing an uplink throttling operation. If the first condition and the second condition are met (yes in 1203), the electronic device 101 may perform a UL throttling operation on the second connection in operation 1205. After performing the uplink throttling operation, the electronic device 101 may identify CellGroup0 RSRP corresponding to the first connection and CellGroup1 RSRP corresponding to the second connection in operation 1207. As at least part of identifying the uplink throttling operation stop condition, the electronic device 101 may identify whether CellGroup1 RSRP exceeds $RSRP_{ThresholdForWeak}$ plus Hyst which is the hysteresis offset, or identify whether CellGroup0 RSRP is less than $RSRP_{ThresholdForNormal}$ minus Hyst which is the hysteresis offset, and the difference between CellGroup0 RSRP and CellGroup1 RSRP is less than $RSRP_{DiffThreshold}$ which is a threshold difference in operation 1209. A condition for stopping the uplink throttling operation may be expressed as Equation 2.

$$\text{CellGroup1 RSRP} > RSRP_{ThresholdForWeak} \text{ Hyst OR}$$

$$(\text{CellGroup0 RSRP} < RSRP_{ThresholdForNormal} \text{ Hyst AND CellGroup0 RSRP} - \text{CellGroup1 RSRP} < RSRP_{DiffThreshold})? \quad \text{[Equation 2]}$$

If the condition for stopping the uplink throttling operation is not met (no in 1209), the electronic device 101 may maintain identification of both RSRPs. If the uplink throttling operation stop condition is met (yes in 1209), the electronic device 101 may stop a UL throttling operation on the second connection in operation 1211. Meanwhile, it will be appreciated by one of ordinary skill in the art that application of the hysteresis offset in Equation 2 is merely an example and, according to an embodiment, the hysteresis offset may not be applied.

In an example, it may be assumed that $RSRP_{ThresholdForWeak}$ is −105 dBm, $RSRP_{ThresForNormal}$ is −90 dBm, Hyst is 5 dB, and $RSRP_{ThresDiff}$ is 10 dB. In this case, the condition for performing the uplink throttling operation based on Equation 1 may be: "CellGroup1 RSRP<−105 dBm AND CellGroup0 RSRP>−90 dBm". In this case, the uplink throttling operation stop condition based on Equation 2 may be: "CellGroup1 RSRP>−100 dBm" or "CellGroup0 RSRP<−95 dBm AND CellGroup0 RSRP−CellGroup1 RSRP<10 dB".

Figure 13:
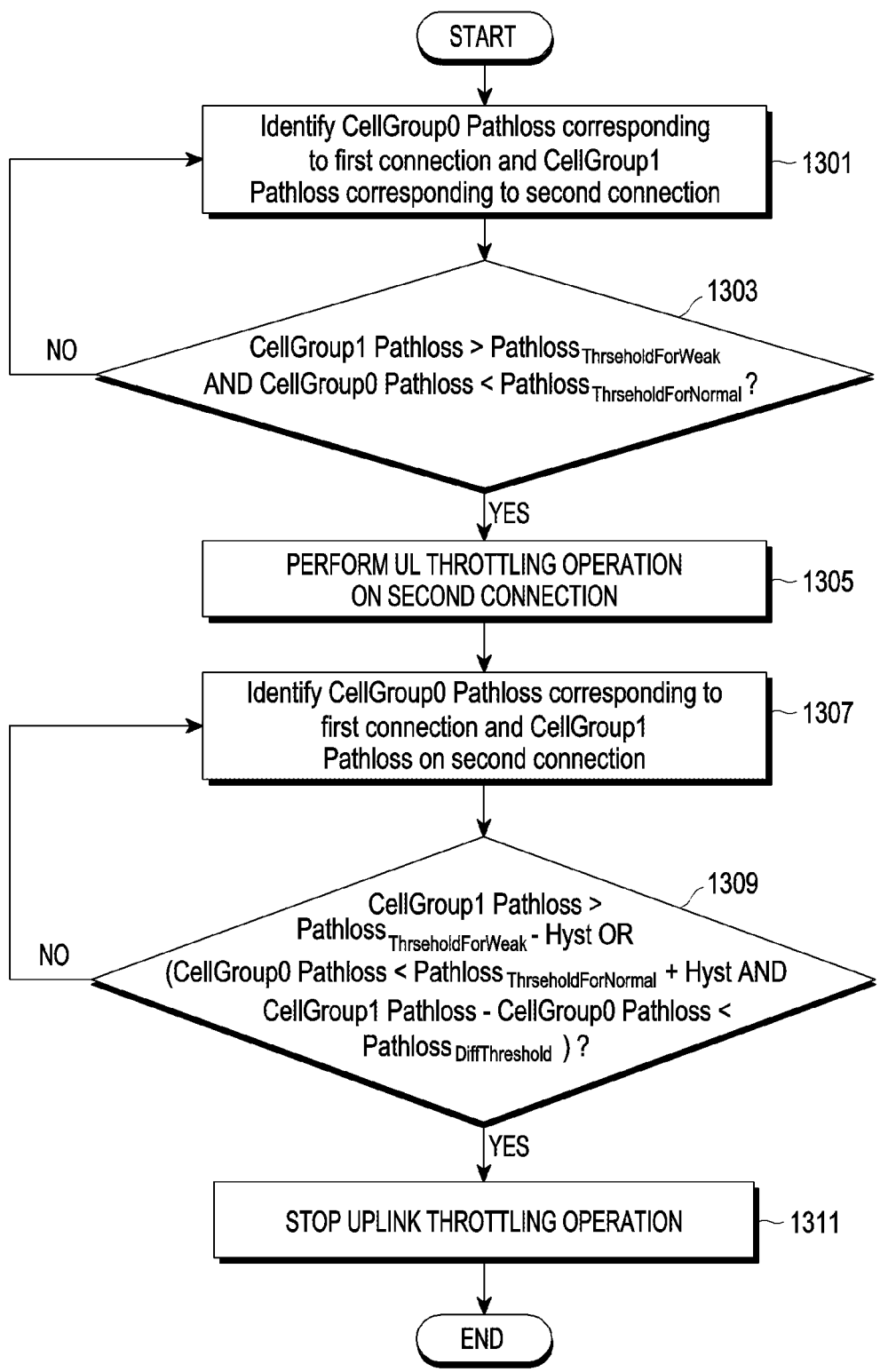
FIG. 13 is a flowchart illustrating an example method of operating an electronic device according to various embodiments.

FIG. 13 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify CellGroup0 PATHLOSS corresponding to the first connection and CellGroup1 PATHLOSS corresponding to the second connection in operation 1301. Here, PATHLOSS is the pathloss of the electronic device 101 and the network (e.g., access network), e.g., $PL_{b,f,c}(q_d)$ in $3^{rd}$ generation partnership project (3GPP) in technical specification (TS) 38.213, or $PL_C$ in TS 36.213, but is not limited. In operation 1303, the electronic device 101 may identify whether CellGroup0 PATHLOSS is less than $PATHLOSS_{ThresholdForNormal}$ which is a first threshold indicating that the uplink channel state is good, as whether the first connection is met, and identify whether CellGroup1 PATHLOSS exceeds than $PATHLOSS_{ThresholdForWeak}$ which is a threshold indicating that the uplink channel state is poor, as the second condition is met. A condition for performing the uplink throttling operation may be expressed as Equation 3.

$$\text{CellGroup1 PATHLOSS} > \text{PATHLOSS}_{ThresholdForWeak}$$
$$\text{AND CellGroup0 PATHLOSS} < \text{PATHLOSS}_{ThresholdForNormal}?$$
[Equation 3]

Here, $\text{PATHLOSS}_{ThresholdForNormal}$ which is the threshold indicating that the uplink channel state is good may be a value different from $\text{PATHLOSS}_{ThresholdForWeak}$ which is the threshold indicating that the uplink channel state is poor, but they may be set to be the same according to implementation. If the first condition is not met and/or the second condition is not met (no in 1303), the electronic device 101 may maintain identification of both PATHLOSSs without performing an uplink throttling operation. If the first condition and the second condition are met (yes in 1303), the electronic device 101 may perform a UL throttling operation on the second connection in operation 1305. After performing the uplink throttling operation, the electronic device 101 may identify CellGroup0 PATHLOSS corresponding to the first connection and CellGroup1 PATHLOSS corresponding to the second connection in operation 1307. As at least part of identifying the uplink throttling operation stop condition, the electronic device 101 may identify whether CellGroup1 PATHLOSS is less than $\text{PATHLOSS}_{ThresholdForWeak}$ minus Hyst which is the hysteresis offset, or identify whether CellGroup0 PATHLOSS exceeds $\text{PATHLOSS}_{ThresholdForNormal}$ plus Hyst which is the hysteresis offset, and the difference between CellGroup0 PATHLOSS and CellGroup1 PATHLOSS is less than $\text{PATHLOSS}_{DiffThreshold}$ which is a threshold difference in operation 1309. A condition for stopping the uplink throttling operation may be expressed as Equation 4.

$$\text{CellGroup1 PATHLOSS} < \text{PATHLOSS}_{ThresholdForWeak} - \text{Hyst}$$
OR
$$(\text{CellGroup0 PATHLOSS} > \text{PATHLOSS}_{ThresholdForNormal} \text{Hyst}$$
$$\text{AND CellGroup1 PATHLOSS} - \text{CellGroup0 PATHLOSS} < \text{PATHLOSS}_{DiffThreshold})?$$
[Equation 4]

If the condition for stopping the uplink throttling operation is not met (no in 1309), the electronic device 101 may maintain identification of both PATHLOSSs. If the uplink throttling operation stop condition is met (yes in 1309), the electronic device 101 may stop a UL throttling operation on the second connection in operation 1311. Meanwhile, it will be appreciated by one of ordinary skill in the art that application of the hysteresis offset in Equation 4 is merely an example and, according to an embodiment, the hysteresis offset may not be applied.

In an example, it may be assumed that $\text{PATHLOSS}_{ThresholdForWeak}$ is 105 dBm, $\text{PATHLOSS}_{ThresForNormal}$ is 90 dBm, Hyst is 5 dB, and $\text{PATHLOSS}_{ThresDiff}$ is 10 dB. In this case, the condition for the uplink throttling operation based on Equation 3 may be: "CellGroup1 PATHLOSS>105 dB AND CellGroup0 PATHLOSS<90 dB". In this case, the uplink throttling operation stop condition based on Equation 4 may be: "CellGroup1 PATHLOSS<100 dB" or "CellGroup0 PATHLOSS>95 dB AND CellGroup1 PATHLOSS−CellGroup0 PATHLOSS<10 dB".

Figure 14:
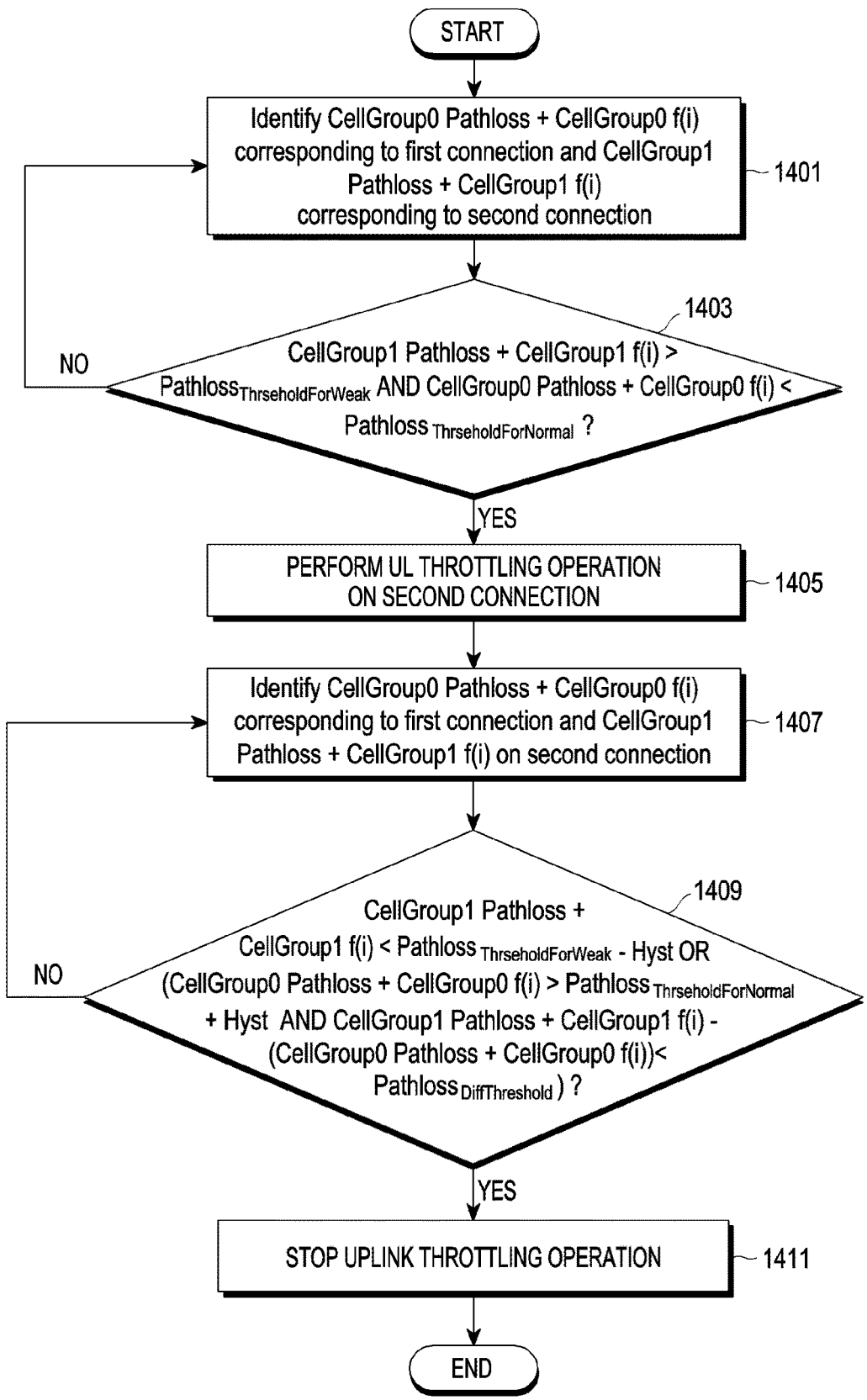
FIG. 14 is a flowchart illustrating an example method of operating an electronic device according to various embodiments.

FIG. 14 is a flowchart illustrating an example method of operating an electronic device according to an embodiment.

According to an embodiment, the electronic device 101 (e.g., at least one of the processor 120, the first communication processor 212, the second communication processor 214, or the integrated communication processor 260) may identify CellGroup0 PATHLOSS+CellGroup0 f(i) corresponding to the first connection and CellGroup1 PATHLOSS+CellGroup1 f(i) corresponding to the second connection in operation 1401. Here, f(i) is power control adjustment state information and may be, e.g., $f_{b,f,c}(i,l)$ in 3GPP TS 38.213 or $f_c(i)$ in TS 36.213, but is not limited. f(i) is information for transmission power command (TPC), and may be, e.g., in dB, but is not limited thereto. In operation 1403, the electronic device 101 may identify whether CellGroup0 PATHLOSS+CellGroup0 f(i) is less than $\text{PATHLOSS}_{ThresholdForNormal}$ which is a first threshold indicating that the uplink channel state is good, as whether the first connection is met, and identify whether CellGroup1 PATHLOSS+CellGroup1 f(i) exceeds than $\text{PATHLOSS}_{ThresholdForWeak}$ which is a threshold indicating that the uplink channel state is poor, as the second condition is met. A condition for performing the uplink throttling operation may be expressed as Equation 5.

$$\text{CellGroup1 PATHLOSS} + \text{CellGroup1} f(i) > \text{PATHLOSS}_{ThresholdForWeak} \text{ AND CellGroup0 PATHLOSS} + \text{CellGroup0} f(i) < \text{PATHLOSS}_{ThresholdForNormal}?$$
[Equation 5]

If the first condition is not met and/or the second condition is not met (no in 1403), the electronic device 101 may maintain identification of the sums of both PATHLOSSs and f(i)'s without performing an uplink throttling operation. If the first condition and the second condition are met (yes in 1403), the electronic device 101 may perform a UL throttling operation on the second connection in operation 1405. After performing the uplink throttling operation, the electronic device 101 may identify CellGroup0 PATHLOSS+CellGroup0 f(i) corresponding to the first connection and CellGroup1 PATHLOSS+CellGroup1 f(i) corresponding to the second connection in operation 1407. As at least part of identifying the uplink throttling operation stop condition, the electronic device 101 may identify whether CellGroup1 PATHLOSS+CellGroup1 f(i) is less than $\text{PATHLOSS}_{ThresholdForWeak}$ minus Hyst which is the hysteresis offset, or identify whether CellGroup0 PATHLOSS+CellGroup0 f(i) exceeds $\text{PATHLOSS}_{ThresholdForNormal}$ plus Hyst which is the hysteresis offset, and the difference between CellGroup0 PATHLOSS+CellGroup0 f(i) and CellGroup1 PATHLOSS+CellGroup1 f(i) is less than $\text{PATHLOSS}_{DiffThreshold}$ which is a threshold difference in operation 1409. A condition for stopping the uplink throttling operation may be expressed as Equation 6.

$$\text{CellGroup1 PATHLOSS} + \text{CellGroup1} f(i) < \text{PATHLOSS}_{ThresholdForWeak} - \text{Hyst OR}$$
$$(\text{CellGroup0 PATHLOSS} + \text{CellGroup0} f(i) > \text{PATHLOSS}_{ThresholdForNormal} + \text{Hyst AND CellGroup1 PATHLOSS} + \text{CellGroup1} f(i) - (\text{CellGroup0 PATHLOSS} + \text{CellGroup0} f(i)) < \text{PATHLOSS}_{DiffThreshold})?$$
[Equation 6]

If the condition for stopping the uplink throttling operation is not met (no in 1409), the electronic device 101 may maintain identification of the sums of both PATHLOSSs and f(i)'s. If the uplink throttling operation stop condition is met (yes in 1409), the electronic device 101 may stop a UL throttling operation on the second connection in operation 1411. Meanwhile, it will be appreciated by one of ordinary skill in the art that application of the hysteresis offset in Equation 6 is merely an example and, according to an embodiment, the hysteresis offset may not be applied.

In an example, it may be assumed that $PATHLOSS_{ThresholdForWeak}$ is 105 dBm, $PATHLOSS_{ThresForNormal}$ is 90 dBm, Hyst is 5 dB, and $PATHLOSS_{ThresDiff}$ is 10 dB. In this case, the condition for the uplink throttling operation based on Equation 5 may be: "CellGroup1 PATHLOSS+CellGroup1 f(i)>105 dB AND CellGroup0 PATHLOSS+CellGroup0 f(i)<90 dB". In this case, the uplink throttling operation stop condition based on Equation 6 may be: "CellGroup1 PATHLOSS+CellGroup1 f(i)<100 dB" or "CellGroup0 PATHLOSS+CellGroup0 f(i)>95 dB AND CellGroup1 PATHLOSS+CellGroup1 f(i)−(CellGroup0 PATHLOSS+CellGroup0 f(i))<10 dB".

Figure 15:
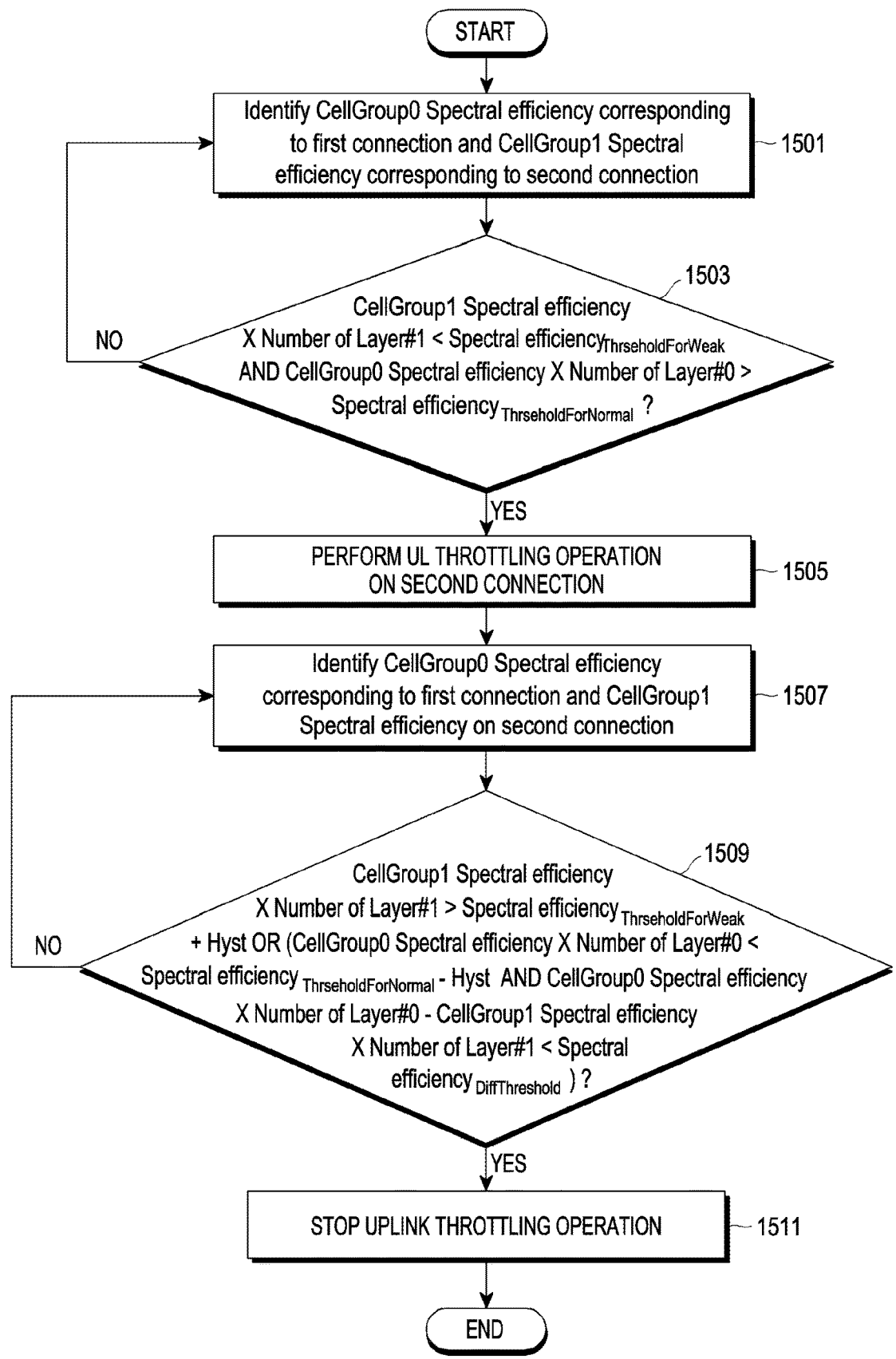
FIG. 15 is a flowchart illustrating an example method of operating an electronic device according to various embodiments.

FIG. 15 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify CellGroup0 SPECTRAL EFFICIENCY corresponding to the first connection and CellGroup1 SPECTRAL EFFICIENCY corresponding to the second connection in operation 1501. Meanwhile, here, SPECTRAL EFFICIENCY may be a value corresponding to the modulation and coding scheme (MCS) index. Table 2 is a correspondence between MCS index and spectral efficiency provided in, for example, 3GPP TS 38.214.

TABLE 2

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

The electronic device 101 may identify spectral efficiency based on association information as shown in Table 2, for example. Meanwhile, in another example, the electronic device 101 may determine whether to perform and/or stop the uplink throttling operation using the MCS index or modulation order, instead of the spectral efficiency. In operation 1503, the electronic device 101 may identify whether the product of CellGroup0 SPECTRAL EFFICIENCY and number of layers (Number of Layer #0) exceeds $SPECTRAL\ EFFICIENCY_{ThresholdForNormal}$ which is a first threshold indicating that the uplink channel state is good, as whether the first connection is met, and identify whether the product of CellGroup1 SPECTRAL EFFICIENCY and number of layers (Number of Layer #1) is less than $SPECTRAL\ EFFICIENCY_{ThresholdForWeak}$ which is a threshold indicating that the uplink channel state is poor, as the second condition is met. A condition for performing the uplink throttling operation may be expressed as Equation 7.

$$\text{CellGroup1 SPECTRAL EFFICIENCY} \times \text{Number of Layer \#1} < \text{SPECTRAL EFFICIENCY}_{ThresholdForWeak} \text{ AND CellGroup0 SPECTRAL EFFICIENCY} \times \text{Number of Layer \#0} > \text{SPECTRAL EFFICIENCY}_{ThresholdForNormal}?$$ [Equation 7]

Here, $SPECTRAL\ EFFICIENCY_{ThresholdForNormal}$ which is the threshold indicating that the uplink channel state is good may be a value different from $SPECTRAL\ EFFICIENCY_{ThresholdForWeak}$ which is the threshold indicating that the uplink channel state is poor, but they may be set to be the same according to implementation. If the first condition is not met and/or the second condition is not met (no in 1503), the electronic device 101 may maintain identification of both SPECTRAL EFFICIENCY's without performing an uplink throttling operation. If the first condition and the second condition are met (yes in 1503), the electronic device 101 may perform a UL throttling operation on the second connection in operation 1505. After performing the uplink throttling operation, the electronic device 101 may identify CellGroup0 SPECTRAL EFFICIENCY corresponding to the first connection and CellGroup1 SPECTRAL EFFICIENCY corresponding to the second connection in operation 1507. As at least part of identifying the uplink throttling operation stop condition, the electronic device 101 may identify whether the product of CellGroup1 SPECTRAL EFFICIENCY and number of layers (Number of Layer #1) exceeds $SPECTRAL\ EFFICIENCY_{ThresholdForWeak}$ plus Hyst which is the hysteresis offset, or identify whether the product of CellGroup0 SPECTRAL EFFICIENCY and number of layers (Number of Layer #0) is less than $SPECTRAL\ EFFICIENCY_{ThresholdForNormal}$ minus Hyst which is the hysteresis offset, and the difference between the product of CellGroup0 SPECTRAL EFFICIENCY and number of layers (Number of Layer #0) and the product of CellGroup1 SPECTRAL EFFICIENCY and number of layers (Number of Layer #1) is less than $SPECTRAL\ EFFICIENCY_{DiffThreshold}$ which is a threshold difference in operation 1509. A condition for stopping the uplink throttling operation may be expressed as Equation 8.

$$\text{CellGroup1 SPECTRAL EFFICIENCY} \times \text{Number of Layer \#1} > \text{SPECTRAL EFFICIENCY}_{ThresholdForWeak} \text{ Hyst OR}$$

$$(\text{CellGroup0 SPECTRAL EFFICIENCY} \times \text{Number of Layer \#0} < \text{SPECTRAL EFFICIENCY}_{ThresholdForNormal} \text{ Hyst AND CellGroup0 SPECTRAL EFFICIENCY} \times \text{Number of Layer \#0} - \text{CellGroup1 SPECTRAL EFFICIENCY} \times \text{Number of Layer \#1} < \text{SPECTRAL EFFICIENCY}_{DiffThreshold})?$$ [Equation 8]

If the condition for stopping the uplink throttling operation is not met (no in 1509), the electronic device 101 may maintain identification of both SPECTRAL EFFICIENCY's. If the uplink throttling operation stop condition is met (yes in 1509), the electronic device 101 may stop a UL throttling operation on the second connection in operation 1511. Meanwhile, it will be appreciated by one of ordinary skill in the art that application of the hysteresis offset in Equation 8 is merely an example and, according to an embodiment, the hysteresis offset may not be applied.

In an example, it may be assumed that SPECTRAL EFFICIENCY$_{ThresholdForWeak}$ is 1.3262, SPECTRAL EFFICIENCY$_{ThresForNormal}$ is 2.5703, Hyst is 0.15, and SPECTRAL EFFICIENCY$_{ThresDiff}$ is 1.0. In this case, the condition for the uplink throttling operation based on Equation 7 may be: "CellGroup1 SPECTRAL EFFICIENCY<1.3262 AND CellGroup0 SPECTRAL EFFICIENCY>2.5703". In this case, the uplink throttling operation stop condition based on Equation 8 may be: "CellGroup1 SPECTRAL EFFICIENCY>1.4762" or "CellGroup0 SPECTRAL EFFICIENCY<2.4203 AND CellGroup0 SPECTRAL EFFICIENCY−CellGroup1 SPECTRAL EFFICIENCY<1.0".

Figure 16:
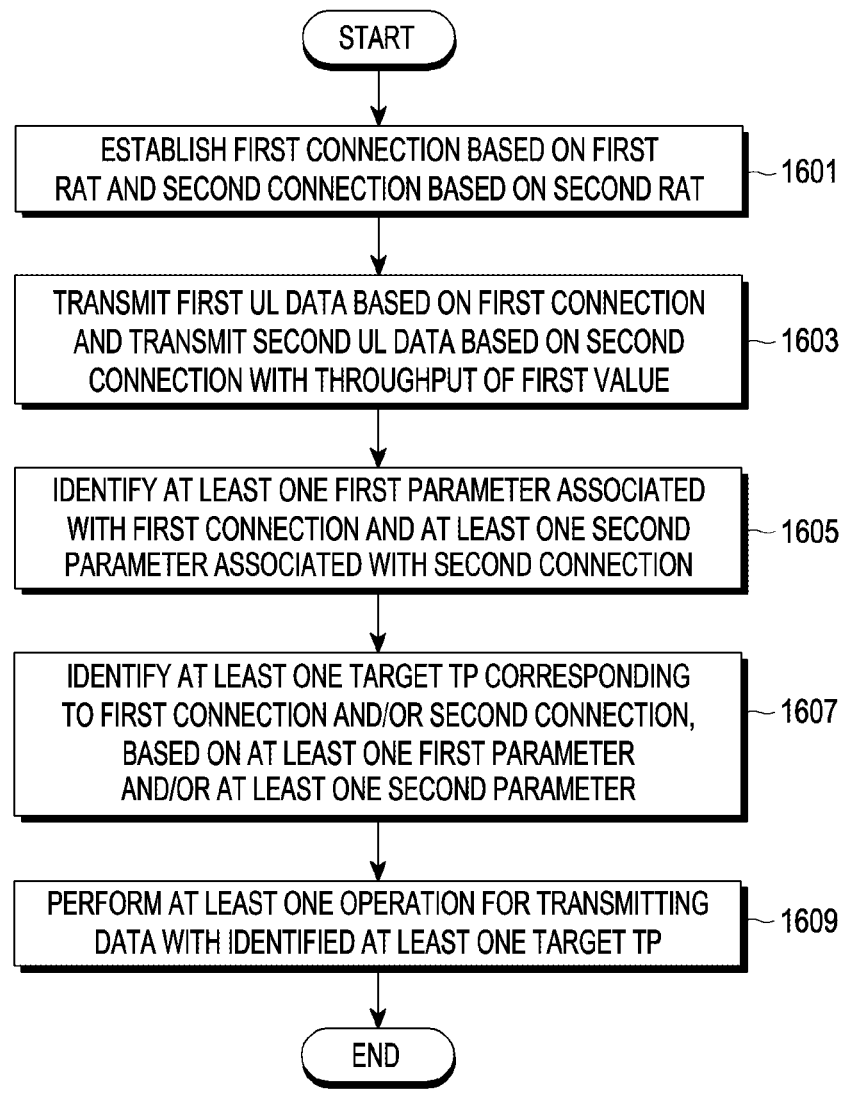
FIG. 16 is a flowchart illustrating an example method of operating an electronic device according to various embodiments.

FIG. 16 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 1601. In operation 1603, the electronic device 101 may transmit first UL data based on the first connection and may transmit second UL data based on the second connection with a throughput of the first value. In operation 1605, the electronic device 101 may identify at least one first parameter associated with the first connection and at least one second parameter associated with the second connection. In operation 1607, the electronic device 101 may identify at least one target throughput (TP) corresponding to the first connection and/or the second connection based on at least one first parameter and/or at least one second parameter. For example, the electronic device 101 may store first assistance information between parameter and target throughput and identify at least one target throughput corresponding to at least one first parameter and/or at least one second parameter identified by referring to the first assistance information. In operation 1609, the electronic device 101 may perform at least one operation for transmitting data with identified at least one target throughput. The at least one operation for transmitting data with the identified at least one target throughput may include, e.g., adjusting information in the BSR and/or determining not to use some of allocated uplink resources in transmitting uplink data, but is not limited.

Figure 17:
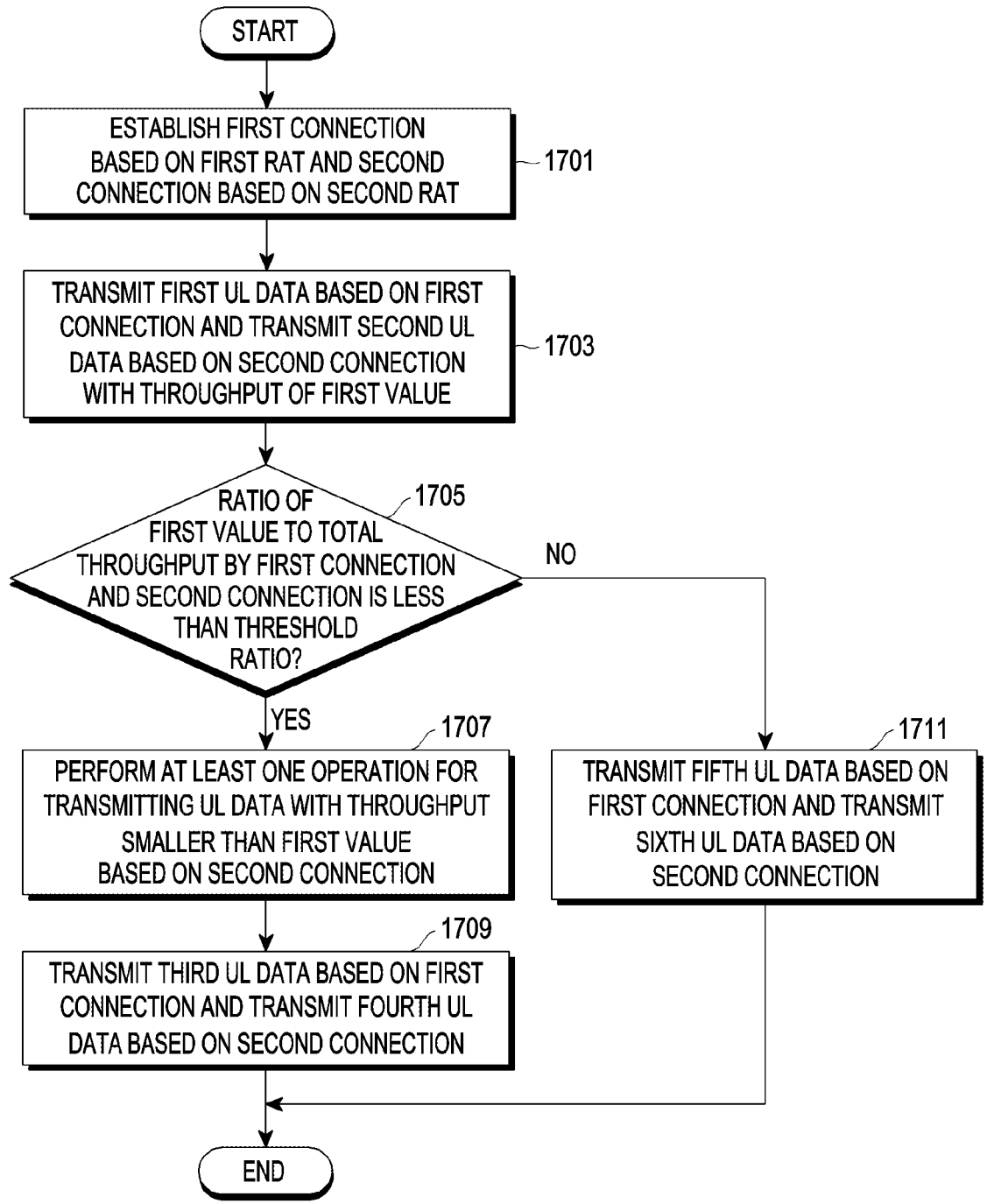
FIG. 17 is a flowchart illustrating an example method of operating an electronic device according to various embodiments.

FIG. 17 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 1701. Establishing the first connection based on the first RAT and the second connection based on the second RAT, e.g., establishing connections based on DC, have been described above, and no detailed description thereof is presented below. In operation 1703, the electronic device 101 may transmit first UL data based on the first connection and may transmit second UL data based on the second connection with a throughput of the first value. In operation 1705, the electronic device 101 may identify whether the ratio of a first value (e.g., throughput by the second connection) to the total throughput by the first connection and the second connection is less than a threshold ratio. For example, the electronic device 101 may identify the throughput corresponding to the first connection, measured at one time, as the throughput corresponding to the first connection, and/or identify the throughput corresponding to the second connection, measured at one time, as the throughput corresponding to the second connection. For example, the electronic device 101 may identify a result of computation based on throughputs corresponding to the first connection, measured at a plurality of times, as the throughput corresponding to the first connection, and/or identify a result of computation based on throughputs corresponding to the second connection, measured at a plurality of times, as the throughput corresponding to the second connection. For example, the computation may be a filtering operation and may be Equation 9.

$$Fn = (1-a) \times Fn-1 + a \times \text{Current Throughput} \quad \text{[Equation 9]}$$

In Equation 9, Fn may refer, for example, to the filtered throughput at the nth time, Fn−1 may refer, for example, to the filtered throughput at the n−1th time, Current Throughput may be throughput measured at a current time, and a may be a filtering coefficient which may be a real number between 0 and 1. Meanwhile, the calculation, such as Equation 9, is merely an example, and is not limited thereto. In an example, an averaging operation may be used, instead of the filtering operation. In this case, the electronic device 101 may identify the average of the throughputs corresponding to the first connection, measured at a plurality of times, as the throughput corresponding to the first connection, and/or identify the average of the throughputs corresponding to the second connection, measured at a plurality of times, as the throughput corresponding to the second connection.

In an embodiment, when the ratio of the first value (e.g., the throughput by the second connection) to the total throughput is less than the threshold ratio (yes in 1705), the electronic device 101 may perform at least one operation for transmitting UL data with a throughput less than the first value based on the second connection in operation 1707. In operation 1709, the electronic device 101 may transmit third UL data based on the first connection and may transmit fourth UL data based on the second connection. For example, when the ratio of the first value (e.g., the throughput by the second connection) to the total throughput is less than the threshold ratio, uplink throttling may be configured to be performed. When the ratio of the first value (e.g., the throughput by the second connection) to the total throughput is less than the threshold ratio, although uplink throttling on the second connection is performed, the degree of decrease of the total throughput may be relatively small. When the ratio of the first value (e.g., the throughput by the second connection) to the total throughput is the threshold ratio or more (no in 1705), the electronic device 101 may transmit fifth UL data based on the first connection and sixth UL data based on the second connection in operation 1711. In this case, the electronic device 101 may not perform uplink throttling. For example, when the ratio of the first value (e.g., the throughput by the second connection) to the total throughput is the threshold ratio or more, uplink throttling may be configured not to be performed. When the ratio of the first value (e.g., the throughput by the second connection) to the total throughput is the threshold ratio or more, if uplink throttling on the second connection is performed, the degree of decrease of the total throughput may be relatively large, so that uplink throttling may be refrained from being performed. Here, the threshold ratio is a value at which the degree of decrease of the total throughput based on uplink throttling may be set to be relatively small, and may be, e.g., 0.2, but is not limited. For example, the threshold ratio may be a fixed value. For example, the threshold ratio may be changed, depending on other parameters. For example, the threshold ratio may be changed depending on the total throughput. For example, the threshold ratio may be changed based on the state of the electronic device 101 (e.g., overtemperature, or measured temperature), but this is merely an example, and it will be appreciated by one of ordinary skill in the art that there are no limitations on the parameters for determining the threshold ratio.

According to an embodiment, in performing UL throttling as in operation 1707, the electronic device 101 may determine the degree of UL throttling and/or the target throughput based on the ratio of the first value (e.g., the throughput by the second connection) to the total throughput. Table 3 is an example of the degree of UL throttling and/or target throughput corresponding to the ratio of the first value (e.g., the throughput by the second connection) to the total throughput.

TABLE 3

| ratio of first value (e.g., throughput by second connection) to total throughput | degree of UL throttling and/or target throughput |
|---|---|
| 0.15 or more, and less than 0.2 | perform UL throttling to reduce the throughput of second connection by 50% |
| 0.1 or more, and less than 0.15 | perform UL throttling to reduce the throughput of second connection by 80% |
| less than 0.1 | perform UL throttling so that target throughput is 1 Mbps |

For example, the electronic device 101 may set the degree of UL throttling and/or target throughput corresponding to the identified ratio, based on the assistance information as shown in Table 3. For example, the electronic device 101 may set the degree of UL throttling corresponding to the identified ratio (e.g., adjust the throughput by a specific ratio to the current throughput). For example, the electronic device 101 may adjust the throughput to the target throughput corresponding to the identified ratio. Meanwhile, it will be appreciated by one of ordinary skill in the art that setting a different degree of UL throttling and/or target throughput based on the ratio of the first value to the total target throughput is merely an example, and one degree of UL throttling and/or target throughput may be set when the ratio is less than the threshold ratio.

Figure 18A:
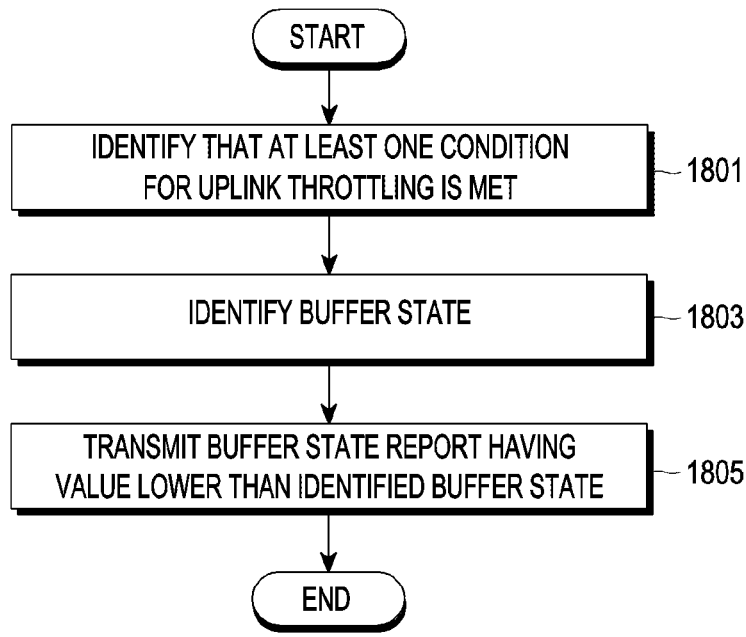
FIG. 18A is a flowchart illustrating an example method of operating an electronic device according to various embodiments.

FIG. 18A is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify meeting at least one condition for uplink throttling in operation 1801. In operation 1803, the electronic device 101 may identify the buffer state. In operation 1805, the electronic device 101 may transmit a buffer state report (BSR) having a value lower than the identified buffer state. The electronic device 101 may receive a UL grant corresponding to the buffer state report having a lower value than the identified buffer state and transmit UL data using the uplink resources identified based on the UL grant. As the buffer state report having a lower value than the identified buffer state is transmitted, the uplink throughput of the electronic device 101 may be reduced as compared with the existing one. For example, when the electronic device 101 reduces the throughput (TP) by a specific ratio to the current throughput, the target throughput may be identified by applying a specific ratio to the current throughput. For example, upon identifying that the current throughput is A, and a throughput reduction by 80%, the electronic device 101 may determine that the target throughput is 0.2XA. The electronic device 101 may identify the value of the buffer state included in the BSR, based on, e.g., the time difference between the time of last transmission of the BSR and the time of transmission of the BSR and the target throughput. Meanwhile, the method of determining the value of the buffer state included in the BSR is merely an example, and the method for determining the value of the buffer state is not limited.

Figure 18B:
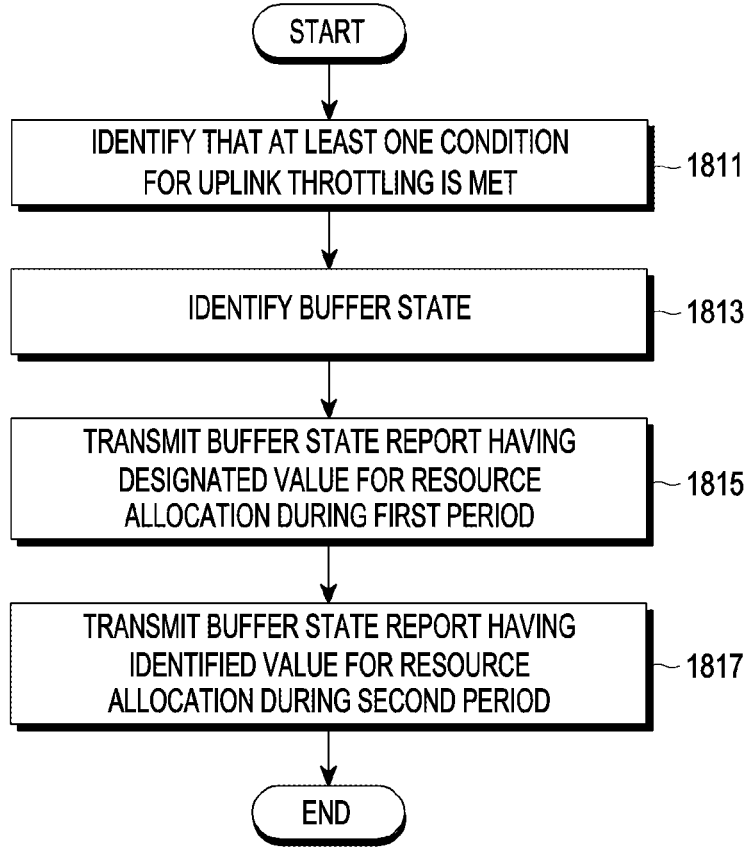
FIG. 18B is a flowchart illustrating an example method of operating an electronic device according to various embodiments.

FIG. 18B is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify meeting at least one condition for uplink throttling in operation 1811. In operation 1813, the electronic device 101 may identify the buffer state. In operation 1815, the electronic device 101 may transmit a buffer state report of a designated value for resource allocation during a first period. For example, the designated value may be 0, but this is merely an example and may be set to a relatively low value. In operation 1817, the electronic device 101 may transmit a buffer state report of a designated value (e.g., value corresponding to the identified buffer state) for resource allocation during a second period. As described above, since the BSR of the designated value (which is, e.g., 0, but is not limited) may be transmitted during the first period, and the BSR of the value corresponding to the identified buffer state may be transmitted during the second period, UL throughput may be reduced as compared with when only BSRs corresponding to the identified buffer state are transmitted. For example, the electronic device 101 may identify the first period and the second period (or the ratio between the periods) based on the degree of UL throttling and/or the target throughput. For example, when the designated value is 0, the electronic device 101 may determine whether to transmit the BSR of the designated value at the current time or transmit the BSR of a valid value (e.g., value corresponding to the identified buffer state) based on the time of last transmission of the valid value (e.g., value corresponding to the identified buffer state) and degree of UL throttling and/or target throughput. Meanwhile, the method of determining the first period and the second period is merely an example, and the method for determining the value of the buffer state is not limited.

Figure 18C:
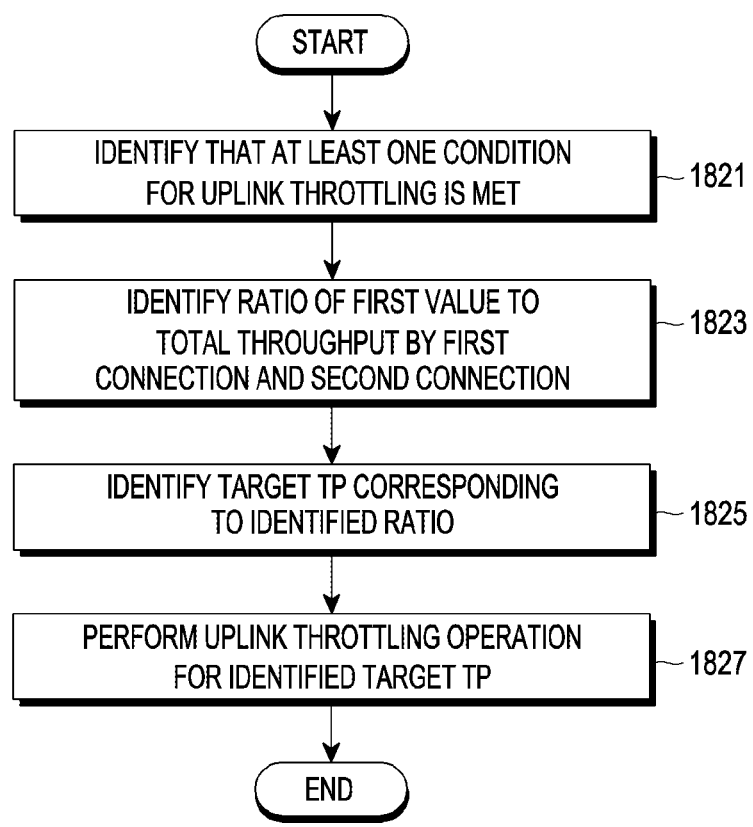
FIG. 18C is a flowchart illustrating an example method of operating an electronic device according to various embodiments.

FIG. 18C is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may identify meeting at least one condition for uplink throttling in operation 1821. In operation 1823, the electronic device 101 may identify the ratio of a first value (e.g., throughput corresponding to the second connection) to the total throughput by the first connection and the second connection. In operation 1825, the electronic device 101 may identify the target throughput corresponding to the identified ratio. The electronic device 101 may identify the target throughput based on, e.g., the assistance information as shown in Table 3 and/or the current throughput. For example, the electronic device 101 may identify the degree of UL throttling corresponding to the identified ratio. The electronic device 101 may identify the target throughput by applying the degree of UL throttling to the current throughput. For example, the electronic device 101 may identify the target throughput corresponding to the identified ratio. In operation 1827, the electronic device 101 may perform an uplink throttling operation for the identified target throughput. For example, the electronic device 101 may perform the uplink throttling operation for the target throughput by transmitting a BSR including a value determined based on the target throughput. For example, the electronic device 101 may perform the uplink throttling operation for the target throughput by transmitting a BSR of a designated value (e.g., 0) during a first period and transmitting a BSR of a value corresponding to the identified buffer state. The first period and the second period (or ratio between the periods) may be determined based on the target throughput.

Figure 19:
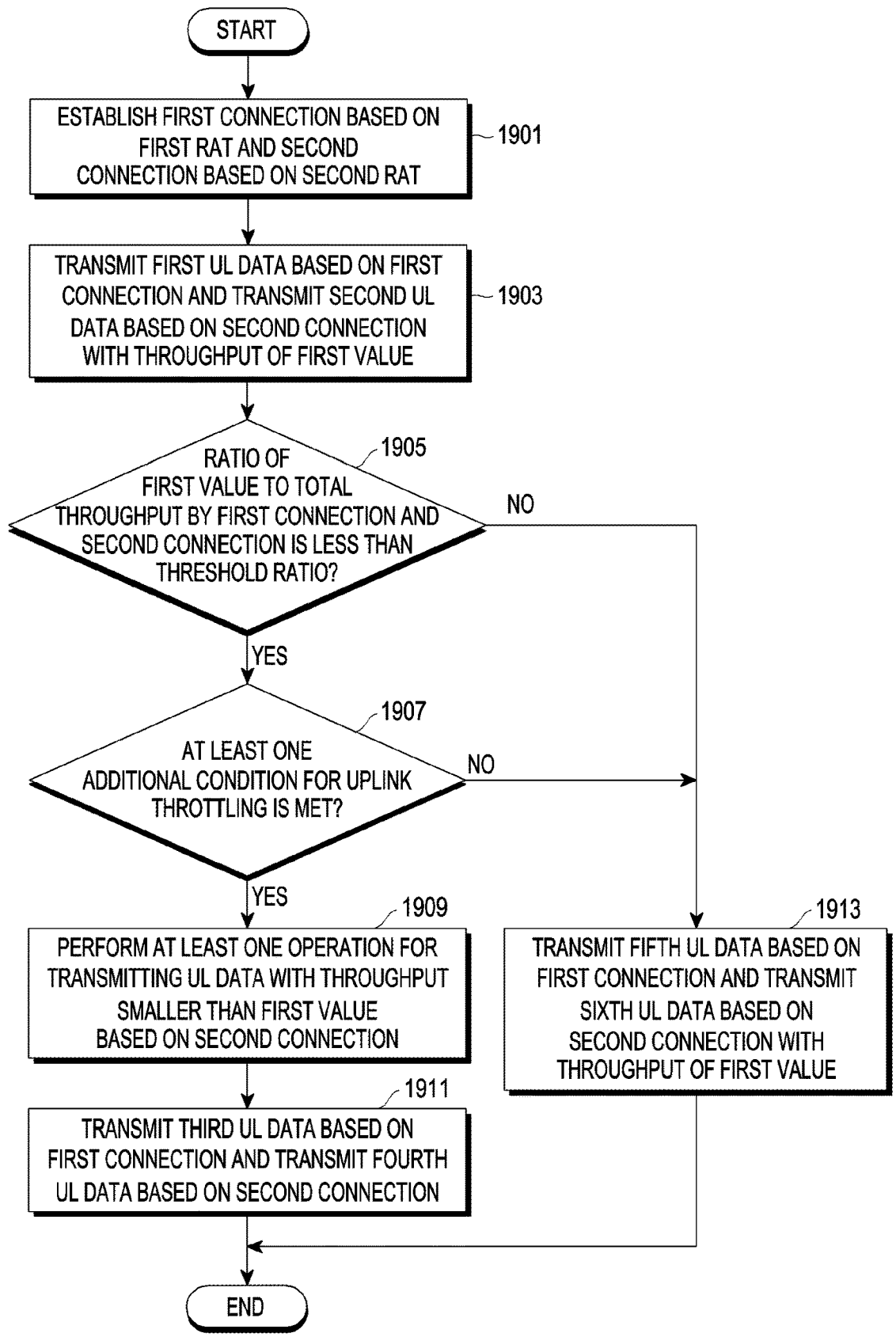
FIG. 19 is a flowchart illustrating an example method of operating an electronic device according to various embodiments.

FIG. 19 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 1901. In operation 1903, the electronic device 101 may transmit first UL data based on the first connection and may transmit second UL data based on the second connection with a throughput of the first value. In operation 1905, the electronic device 101 may identify whether the ratio of a first value to the total throughput by the first connection and the second connection is less than a threshold ratio. When the ratio of the first value to the total throughput is less than the threshold ratio (yes in 1905), the electronic device 101 may identify whether at least one additional condition for uplink throttling is met in operation 1907. For example, the at least one additional condition may include the condition that the received strength (e.g., at least one of the RSRP, RSRQ, or RSSI, but is not limited) corresponding to the second connection is less than a threshold strength. For example, the at least one additional condition may include the condition that the BSR value (or buffer state value) corresponding to the second connection exceeds a threshold (which may also be referred to as threshold BSR). For example, the at least one additional condition may include the condition that the spectral efficiency of the second connection is a first threshold spectral efficiency or less. For example, the at least one additional condition may include the condition that the spectral efficiency of the first connection is a second threshold spectral efficiency or more. The first threshold spectral efficiency and/or the second threshold spectral efficiency may be set depending on the RAT and/or operation band but, without limitations thereto, may be implemented as fixed values. Upon identifying that the at least one additional condition for uplink throttling is met (yes in 1907), the electronic device 101 may perform at least one operation for transmitting UL data with a throughput less than the first value, based on the second connection in operation 1909. In operation 1911, the electronic device 101 may transmit third UL data based on the first connection and may transmit fourth UL data based on the second connection. Upon identifying that the ratio of the first value to the total throughput is the threshold ratio or more (no in 1905), or at least some of the at least one additional condition for uplink throttling are not met (no in 1907), the electronic device 101 may transmit fifth UL data based on the first connection and transmit sixth UL data based on the second connection with the throughput of the first value in operation 1913.

Table 4 is an example of conditions for performing uplink throttling.

TABLE 4

RSRP of Cell Group 0 < RSRP_Threshold (e.g., a1 dBm)
AND Uplink Filtered Throughput of Cell Group 0/(Uplink Filtered Throughput of Cell Group 0 + Cell Group 1 ) < Throughput_Ratio_Threshold (e.g., a2)
AND BSR of Cell Group 0 > BSR_Threshold (e.g., a3 Bytes)
AND Spectral efficiency of Cell Group 0 <= SpectralEfficiency_Threshold0 (e.g., a4 for NR, and a5 for E-UTRA)
AND Spectral efficiency of Cell Group 1 >= SpectralEfficiency_Threshold1 (e.g., a6 for NR, and a7 for E-UTRA)

Meanwhile, in Table 4, although SpectralEfficiency_Threshold0 and SpectralEfficiency_Threshold1 are set to the same value, this is merely an example, and they may be different. Example values of SpectralEfficiency_Threshold0 and SpectralEfficiency_Threshold1 are intermediate values between MCS 16 and 17, but are not limited. Further, Filtered Throughput may be set as $Fn=(1-a) \times Fn-1 + a \times Current Throughput$, as in Equation 9, and a may be, e.g., 0.5. Meanwhile, the above numerical values are mere examples, and are not limited. Meanwhile, one of ordinary skill in the art will understand that any one of the subconditions in the examples of Table 4 may be omitted, and/or additional subconditions may be added.

Figure 20:
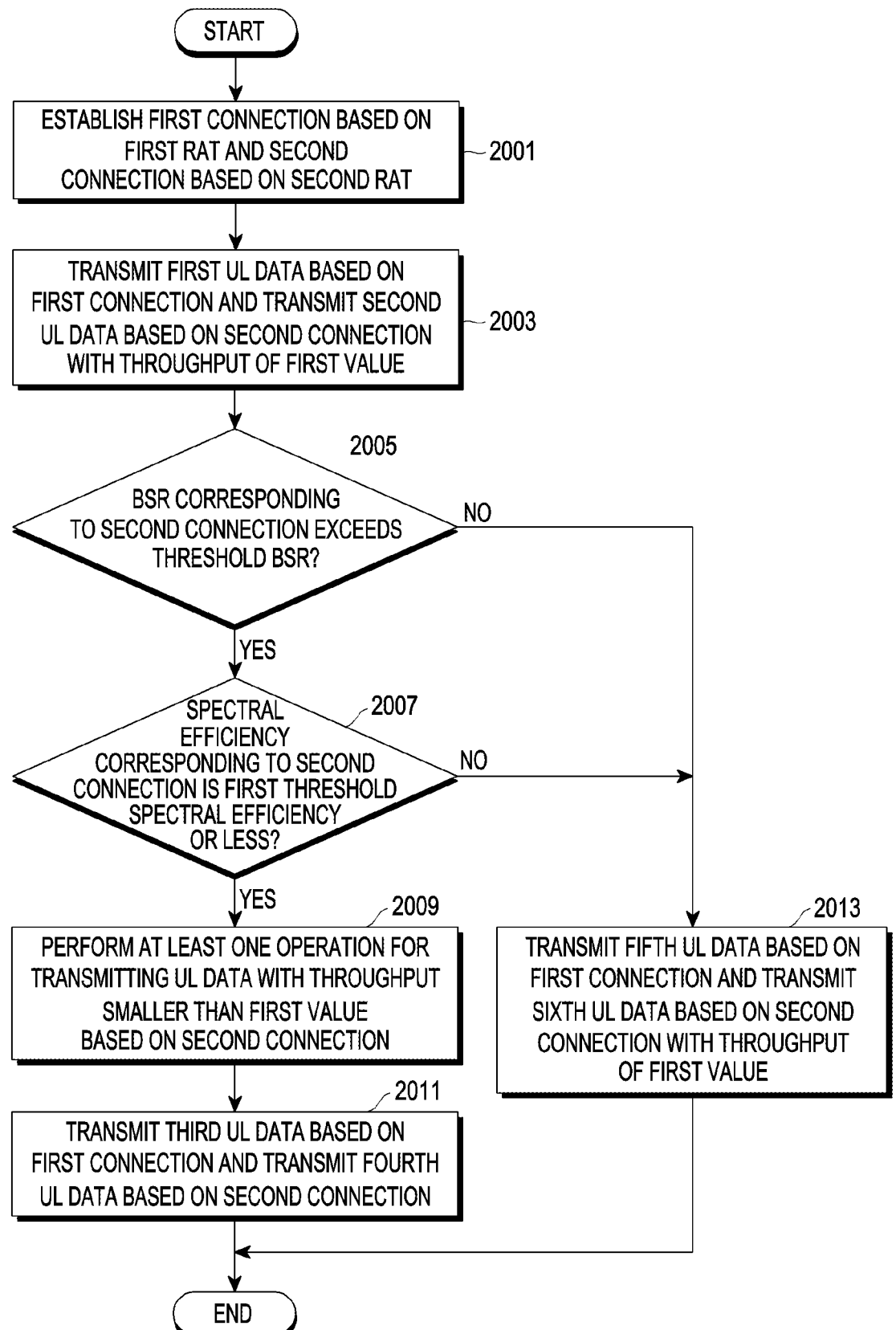
FIG. 20 is a flowchart illustrating an example method of operating an electronic device according to various embodiments.

FIG. 20 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 2001. In operation 2003, the electronic device 101 may transmit first UL data based on the first connection and may transmit second UL data based on the second connection with a throughput of the first value. In operation 2005, the electronic device 101 may identify whether the BSR corresponding to the second connection exceeds the threshold BSR. When the BSR corresponding to the second connection exceeds the threshold BSR (yes in 2005), the electronic device 101 may identify whether the spectral efficiency corresponding to the second connection is a first threshold spectral efficiency or less in operation 2007. When the spectral efficiency corresponding to the second connection is the first threshold spectral efficiency or less (yes in 2007), the electronic device 101 may perform at least one operation for transmitting UL data with a throughput less than the first value, based on the second connection in operation 2009. In operation 2011, the electronic device 101 may transmit third UL data based on the first connection and may transmit fourth UL data based on the second connection. When the BSR corresponding to the second connection is the threshold BSR or less (no in 2005) or the spectral efficiency corresponding to the second connection exceeds the first threshold spectral efficiency (no in 2007), the electronic device 101 may transmit fifth UL data based on the first connection and transmit sixth UL data based on the second connection with the throughput of the first value in operation 2013. As described above, when the BSR corresponding to the second connection exceeds the threshold BSR, and the spectral efficiency corresponding to the second connection is the first threshold spectral efficiency or less, the electronic device 101 may perform the uplink throttling operation. For example, when relatively few RBs are allocated, the transmission power per RB may be relatively high, and the MCS may increase. Accordingly, when the RB allocation is relatively low, the effect achieved when determining whether to perform uplink throttling only with the spectral efficiency may be relatively low. Meanwhile, the BSR exceeding the threshold BSR may refer, for example, to a relatively large PUSCH being allocated to the electronic device 101. As the electronic device 101 performs UL throttling when the BSR exceeds the threshold BSR, and the spectral efficiency corresponding to the second connection is the first threshold spectral efficiency or less, the possibility that the effect of uplink throttling when the RB allocation is relatively low is relatively reduced may be prevented. Meanwhile, spectral efficiency being lower than the first threshold spectral efficiency may indicate that the state of the corresponding channel is relatively poor.

Figure 21:
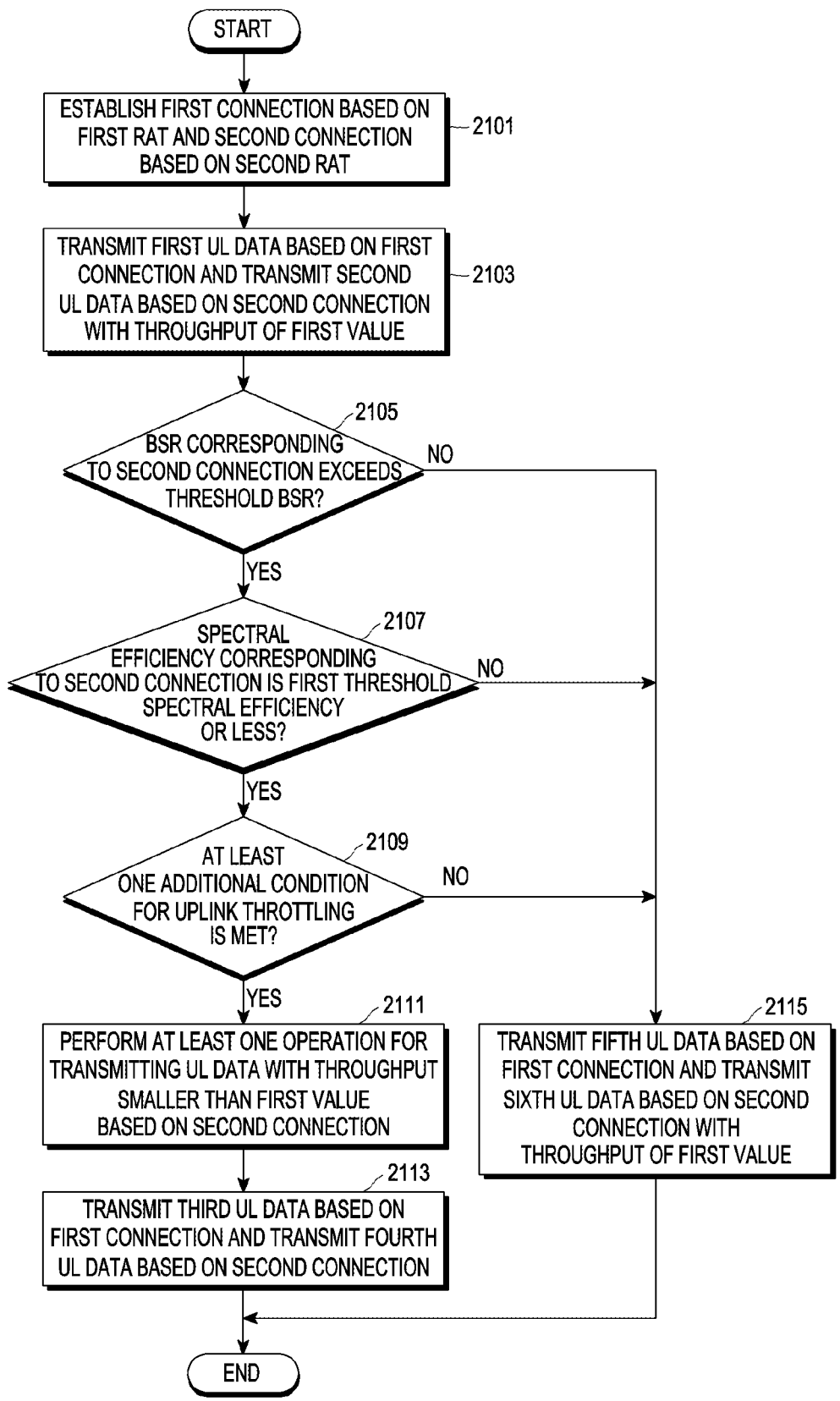
FIG. 21 is a flowchart illustrating an example method of operating an electronic device according to various embodiments.

FIG. 21 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 2101. In operation 2103, the electronic device 101 may transmit first UL data based on the first connection and may transmit second UL data based on the second connection with a throughput of the first value. In operation 2105, the electronic device 101 may identify whether the BSR corresponding to the second connection exceeds the threshold BSR. When the BSR corresponding to the second connection exceeds the threshold BSR (yes in 2105), the electronic device 101 may identify whether the spectral efficiency corresponding to the second connection is a first threshold spectral efficiency or less in operation 2107. When the spectral efficiency corresponding to the second connection is the first threshold spectral efficiency or less (yes in 2107), the electronic device 101 may identify whether at least one additional condition for uplink throttling is met in operation 2109. For example, the at least one additional condition may include the condition that the received strength (e.g., at least one of the RSRP, RSRQ, or RSSI, but is not limited) corresponding to the second connection is less than a threshold strength. For example, the at least one additional condition may include the condition that the ratio of the first value (e.g., the throughput by the second connection) to the total throughput by the first connection and the second connection is less than the threshold ratio. For example, the at least one additional condition may include the condition that the spectral efficiency of the first connection is a second threshold spectral efficiency or more. Upon identifying that the at least one additional condition for uplink throttling is met (yes in 2109), the electronic device 101 may perform at least one operation for transmitting UL data with a throughput less than the first value, based on the second connection in operation 2111. In operation 2113, the electronic device 101 may transmit third UL data based on the first connection and may transmit fourth UL data based on the second connection. When the BSR corresponding to the second connection is the threshold BSR or less (no in 2105), the spectral efficiency corresponding to the second connection exceeds the first threshold spectral efficiency (no in 2107), or at least some of the at least one additional condition are not met (no in 2109), the electronic device 101 may transmit fifth UL data based on the first connection and transmit sixth UL data based on the second connection with the throughput of the first value in operation 2115.

Figure 22:
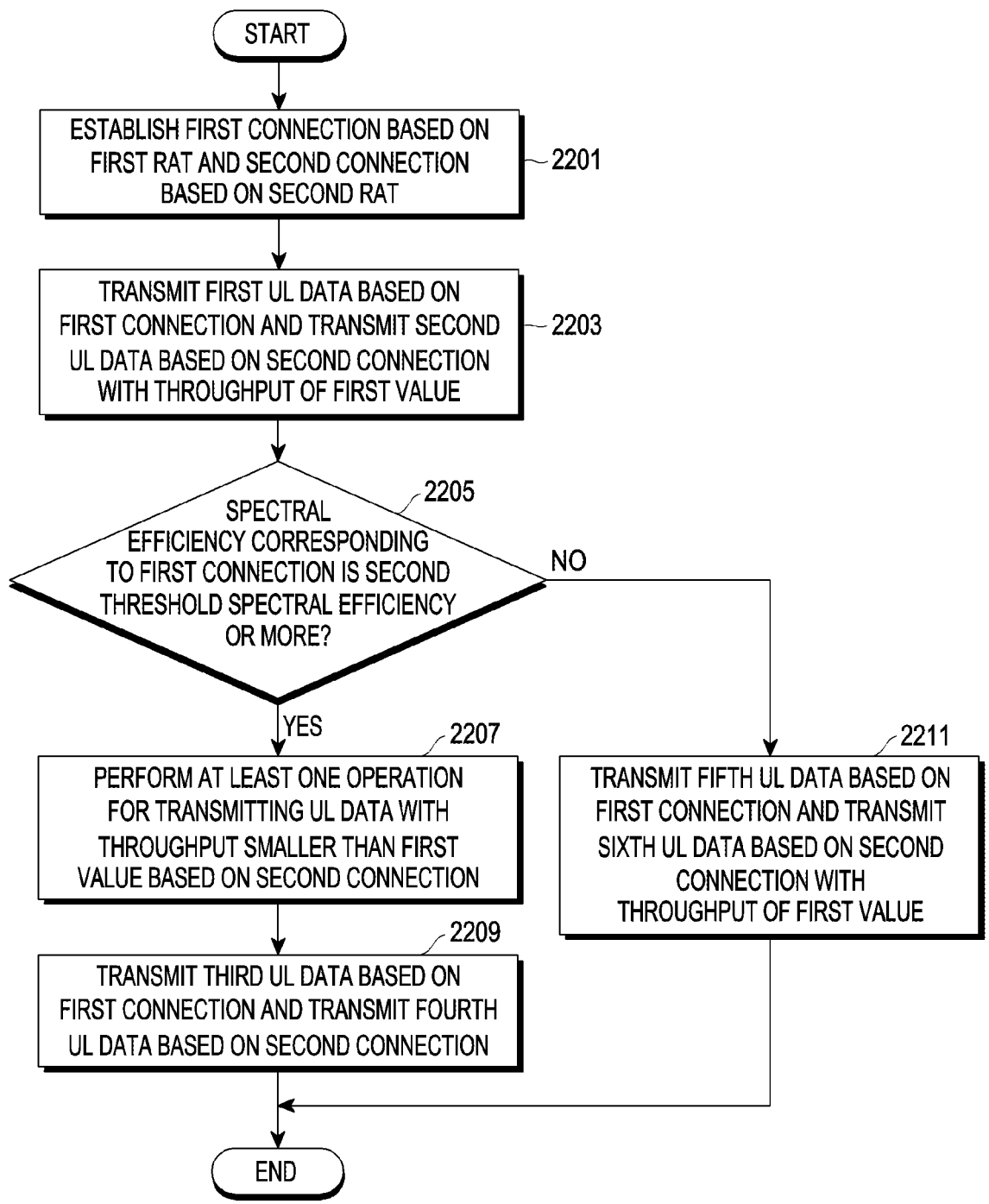
FIG. 22 is a flowchart illustrating an example method of operating an electronic device according to various embodiments.

FIG. 22 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 2201. In operation 2203, the electronic device 101 may transmit first UL data based on the first connection and may transmit second UL data based on the second connection with a throughput of the first value. In operation 2205, the electronic device 101 may identify whether the spectral efficiency corresponding to the first connection is a second threshold spectral efficiency or more. When the spectral efficiency corresponding to the first connection is the second threshold spectral efficiency or more (yes in 2205), the electronic device 101 may perform at least one operation for transmitting UL data with a throughput smaller than the first value, based on the second connection in operation 2207. In operation 2209, the electronic device 101 may transmit third UL data based on the first connection and may transmit fourth UL data based on the second connection. When the spectral efficiency corresponding to the first connection is less than the second threshold spectral efficiency (no in 2205), the electronic device 101 may transmit fifth UL data based on the first connection and transmit sixth UL data based on the second connection with the throughput of the first value in operation 2211. As described above, when the spectral efficiency corresponding to the first connection is a relatively high value (e.g., the second threshold spectral efficiency or more), the electronic device 101 may perform uplink throttling corresponding to the second connection. The spectral efficiency corresponding to the first connection being a relatively high value (e.g., the second threshold spectral efficiency or more) may also refer, for example, to the channel state of the first connection being relatively good. The channel state of the first connection should be relatively good to secure a relatively high throughput based on the first connection. Thus, although uplink throttling is performed on the second connection, the throughput based on the entire DC may remain as a relatively high value.

Figure 23:
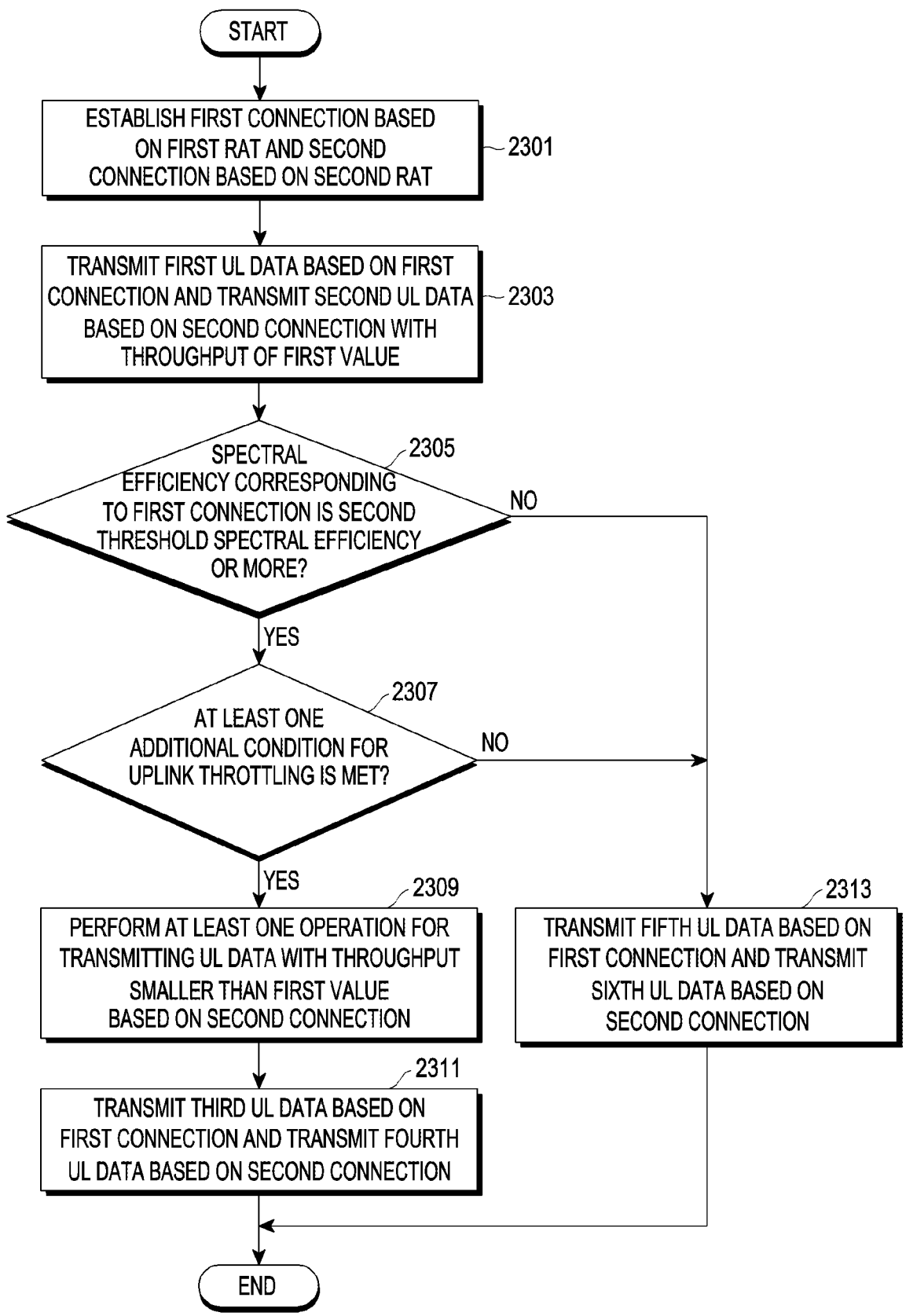
FIG. 23 is a flowchart illustrating an example method of operating an electronic device according to various embodiments.

FIG. 23 is a flowchart illustrating an example method of operating an electronic device according to various embodiments.

According to an embodiment, the electronic device 101 (e.g., at least one of the processor 120, the first communication processor 212, the second communication processor

214, or the integrated communication processor 260) may establish a first connection based on a first RAT and a second connection based on a second RAT in operation 2301. In operation 2303, the electronic device 101 may transmit first UL data based on the first connection and may transmit second UL data based on the second connection with a throughput of the first value. In operation 2305, the electronic device 101 may identify whether the spectral efficiency corresponding to the first connection is a second threshold spectral efficiency or more. When the spectral efficiency corresponding to the first connection is the second threshold spectral efficiency or more (yes in 2305), the electronic device 101 may identify whether at least one additional condition for uplink throttling is met. For example, the at least one additional condition may include the condition that the received strength (e.g., at least one of the RSRP, RSRQ, or RSSI, but is not limited) corresponding to the second connection is less than a threshold strength. For example, the at least one additional condition may include the condition that the ratio of the first value (e.g., the throughput by the second connection) to the total throughput by the first connection and the second connection is less than the threshold ratio. For example, the at least one additional condition may include the condition that the BSR value (or buffer state value) corresponding to the second connection exceeds a threshold (which may also be referred to as threshold BSR). For example, the at least one additional condition may include the condition that the spectral efficiency of the second connection is a first threshold spectral efficiency or less. When the at least one additional condition is met (yes in 2307), the electronic device 101 may perform at least one operation for transmitting UL data with a throughput less than the first value, based on the second connection in operation 2309. In operation 2311, the electronic device 101 may transmit third UL data based on the first connection and may transmit fourth UL data based on the second connection. When the spectral efficiency corresponding to the first connection is less than the second threshold spectral efficiency (no in 2305) or at least some of the at least one additional condition are not met (no in 2307), the electronic device 101 may transmit fifth UL data based on the first connection and transmit sixth UL data based on the second connection with the throughput of the first value in operation 2313.

Figure 24:
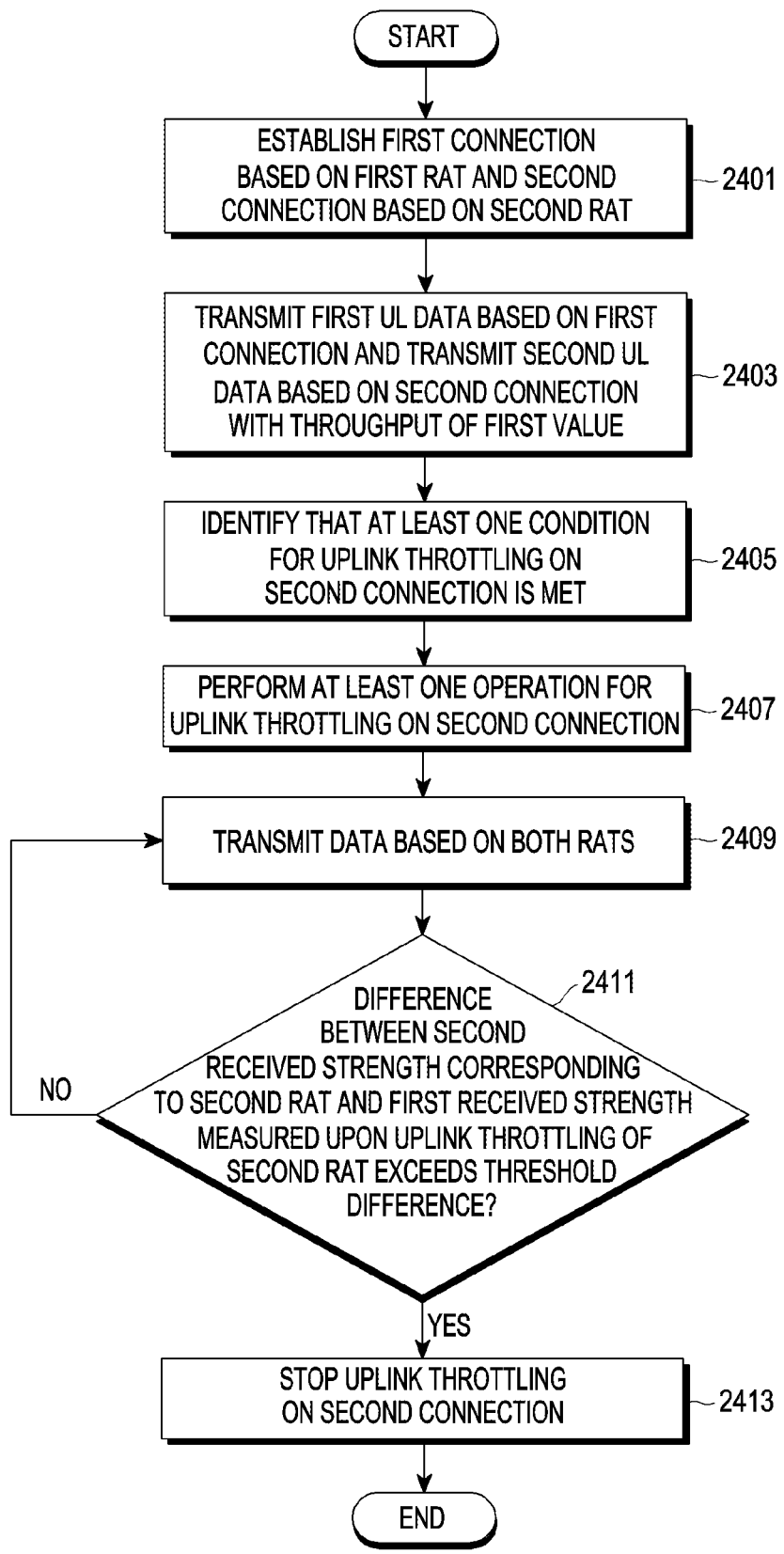
FIG. 24 is a flowchart illustrating an example method of operating an electronic device according to various embodiments.

FIG. 24 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 2401. In operation 2403, the electronic device 101 may transmit first UL data based on the first connection and may transmit second UL data based on the second connection with a throughput of the first value. In operation 2405, the electronic device 101 may identify that at least one condition for uplink throttling on the second connection is met. The at least one condition for uplink throttling on the second connection may be at least one of various conditions described in connection with various embodiments of the disclosure, but is not limited. In operation 2407, the electronic device 101 may perform at least one operation for uplink throttling on the second connection. After performing at least one operation for uplink throttling, the electronic device 101 may transmit data based on both the RATs in operation 2409. As at least one operation for uplink throttling on the second connection is performed, the throughput corresponding to the second connection may be a value less than the first value. Uplink throttling may be maintained while data is transmitted based on both the RATs in operation 2409.

According to an embodiment, in operation 2411, the electronic device 101 may identify whether the difference between the second received strength corresponding to the second RAT and the first received strength measured upon uplink throttling of the second RAT exceeds a threshold difference. It will be appreciated by one of ordinary skill in the art that the first received strength and the second received strength may be, e.g., RSRPs, but other types of received strengths may be used. Each of the first received strength and the second received strength may be, e.g., a value measured at one time. For example, each of the first received strength and the second received strength may be a result (e.g., average or filtered computed value) of computation on the values corresponding to the first connection measured at a plurality of times and the values corresponding to the second connection measured at a plurality of times, but is not limited. Meanwhile, the threshold difference may be a fixed value or a value that is varied depending on the channel state (or other parameters, but not limited). For example, the threshold difference may also be determined based on the spectral efficiency corresponding to the second connection measured at the time of initiation of uplink throttling. When the difference between the second received strength corresponding to the second RAT and the first received strength measured upon uplink throttling of the second RAT exceeds the threshold difference (yes in 2411), the electronic device 101 may stop uplink throttling on the second connection in operation 2413. For example, when the period during which the difference in received strength exceeds the threshold difference is a threshold period (e.g., 5 seconds, but not limited) or longer, the electronic device 101 may be configured to stop uplink throttling, but is not limited. The electronic device 101 may transmit data based on both the RATs after stopping uplink throttling. The difference between the second received strength corresponding to the second RAT and the first received strength measured upon uplink throttling of the second RAT exceeding the threshold difference may refer, for example, to the channel environment corresponding to the second RAT being changed to be better than when uplink throttling is performed. As the channel environment is changed to be good, the electronic device 101 may be configured to stop uplink throttling. When uplink throttling is performed in such a manner as to set the value included in the BSR to a value lower than the identified buffer state, the electronic device 101 may transmit a BSR including a value corresponding to the identified buffer state to the network. When uplink throttling is performed in such a manner as to set the value included in the BSR to a designated value (e.g., 0 but is not limited) during a specific period, the electronic device 101 may transmit a BSR including a value corresponding to the identified buffer state to the network. When the difference between the second received strength corresponding to the second RAT and the first received strength measured upon uplink throttling of the second RAT is the threshold difference or less (no in 2411), the electronic device 101 may transmit data based on both the RATs while maintaining uplink throttling.

As described above, the electronic device 101 may be configured to stop uplink throttling based on identifying that the difference between the second received strength (e.g., the received strength measured at the current time) corresponding to the second RAT and the first received strength measured upon uplink throttling of the second RAT exceeds the threshold difference, which is the condition indicating that the channel environment is changed to be good. Meanwhile, the conditions described in connection with operation 2411 may be replaced with any condition indicating that the channel environment is changed to be good (e.g., condition that the received strength measured at the current time is the threshold received strength or more). Or, it will be appreciated by one of ordinary skill in the art that the uplink throttling operation may be configured to be stopped further based on identifying whether an additional condition indicating that the channel environment is changed to be good is met.

Figure 25:
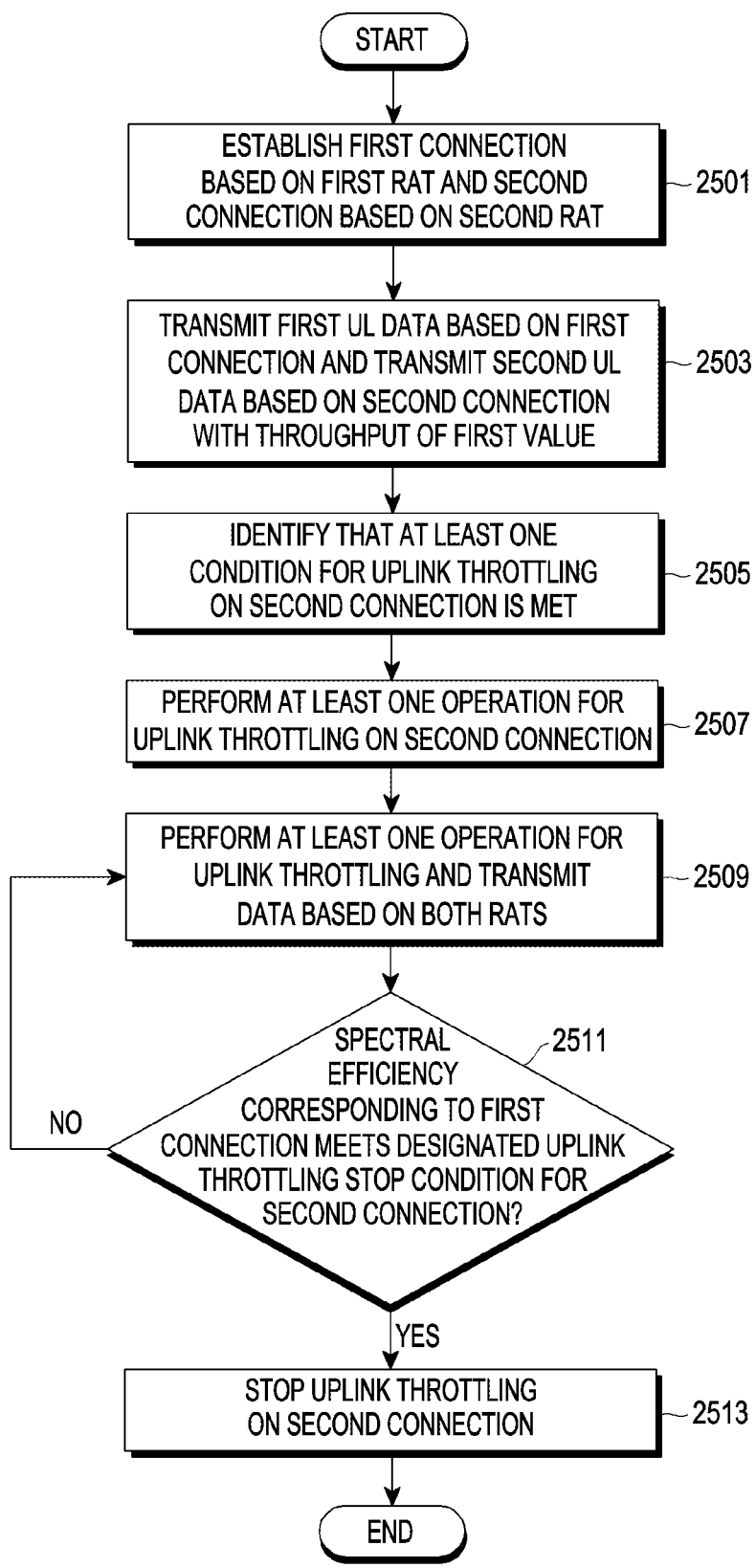
FIG. 25 is a flowchart illustrating an example method of operating an electronic device according to various embodiments.

FIG. 25 is a flowchart illustrating an example method of operating an electronic device according to various embodiments.

According to an embodiment, the electronic device 101 (e.g., at least one of the processor 120, the first communication processor 212, the second communication processor 214, or the integrated communication processor 260) may establish a first connection based on a first RAT and a second connection based on a second RAT in operation 2501. In operation 2503, the electronic device 101 may transmit first UL data based on the first connection and may transmit second UL data based on the second connection with a throughput of the first value. In operation 2505, the electronic device 101 may identify that at least one condition for uplink throttling on the second connection is met. The at least one condition for uplink throttling on the second connection may be at least one of various conditions described in connection with various embodiments of the disclosure, but is not limited. In operation 2507, the electronic device 101 may perform at least one operation for uplink throttling on the second connection. After performing at least one operation for uplink throttling, the electronic device 101 may transmit data based on both the RATs in operation 2509. As at least one operation for uplink throttling on the second connection is performed, the throughput corresponding to the second connection may be a value less than the first value. Uplink throttling may be maintained while data is transmitted based on both the RATs in operation 2509.

According to an embodiment, in operation 2511, the electronic device 101 may identify whether the spectral efficiency corresponding to the first connection meets a designated uplink throttling stop condition on the second connection. For example, the uplink throttling stop condition may include the condition that the spectral efficiency corresponding to the first connection is the threshold spectral efficiency or less. The condition may be a condition indicating that the channel environment worsens in which case the electronic device 101 may stop uplink throttling on the second connection based on the worsening first connection channel environment. For example, the uplink throttling stop condition may include the condition that the spectral efficiency corresponding to the first connection (e.g., spectral efficiency corresponding to the first connection measured at the current time) is equal to or less than the product of the spectral efficiency corresponding to the first connection measured at the time of execution of uplink throttling and a designated ratio (e.g., a positive real number smaller than 1, but is not limited). The spectral efficiency corresponding to the first connection measured at the current time being equal to or less than the product of the spectral efficiency corresponding to the first connection measured at the time of execution of uplink throttling and the designated ratio may be a condition indicating that the channel environment corresponding to the first connection worsens. In this case, the electronic device 101 may stop uplink throttling on the second connection based on the worsening first connection channel environment. When the spectral efficiency corresponding to the first connection meets the designated uplink throttling stop condition for the second connection (yes in 2511), the electronic device 101 may stop uplink throttling on the second connection in operation 2513. The electronic device 101 may transmit data based on both the RATs after stopping uplink throttling. The difference between the second received strength corresponding to the second RAT and the first received strength measured upon uplink throttling of the second RAT exceeding the threshold difference may refer, for example, to the channel environment corresponding to the second RAT being changed to be better than when uplink throttling is performed. As the channel environment is changed to be good, the electronic device 101 may be configured to stop uplink throttling. When uplink throttling is performed in such a manner as to set the value included in the BSR to a value lower than the identified buffer state, the electronic device 101 may transmit a BSR including a value corresponding to the identified buffer state to the network. When uplink throttling is performed in such a manner as to set the value included in the BSR to a designated value (e.g., 0 but is not limited) during a specific period, the electronic device 101 may transmit a BSR including a value corresponding to the identified buffer state to the network. When the spectral efficiency corresponding to the first connection does not meet the designated uplink throttling stop condition for the second connection (no in 2511), the electronic device 101 may transmit data based on both the RATs while maintaining uplink throttling.

As described above, the electronic device 101 may be configured to stop uplink throttling based on meeting the condition indicating that the channel environment of the first connection worsens.

Table 5 is an example of conditions for stopping uplink throttling.

TABLE 5

Cell Group 0 RSRP - RSRP when throttling triggered > RSRP_Threshold (e.g., b2 dB when the spectral efficiency of the second connection measured at the time of initiation of UL throttling is b1 or less (for NR), b5 dB when the spectral efficiency of the second connection measured at the time of initiation of UL throttling exceeds b3 and is b4 or less (for NR), and b7 dB when the spectral efficiency of the second connection measured at the time of initiation of UL throttling exceeds b6 (for NR))
OR (Spectral efficiency of Cell Group 1 <= SpectralEfficiency_Threshold (e.g., b8 for NR, b9 for E-UTRA) AND Spectral efficiency of Cell Group 1 <= Ratio_Threshold (1/2) of the spectral efficiency when throttling triggered)

Meanwhile, one of ordinary skill in the art will understand that any one of the subconditions in the examples of Table 5 may be omitted, and/or additional subconditions may be added.

According to an example embodiment, an electronic device may comprise at least one communication processor. The at least one communication processor may be configured to: establish, based on dual connectivity, a first connection based on a first radio access technology (RAT) and a second connection based on a second RAT; transmit first uplink data based on the first connection and transmit second uplink data based on the second connection, wherein a throughput corresponding to the second connection may be a first value; identify at least one first parameter associated with the first connection and at least one second parameter associated with the second connection; perform at least one operation for transmitting uplink (UL) data with a throughput less than the first value based on the second connection, based on the at least one first parameter satisfying a first condition indicating a good uplink channel state and that the at least one second parameter satisfying a second condition indicating a poor uplink channel state; and based on performing the at least one operation, transmit third uplink data based on the first connection and transmit fourth uplink data based on the second connection, wherein a throughput corresponding to the second connection may be less than the first value.

According to an example embodiment, the at least one communication processor may, as at least part of performing the at least one operation for transmitting the UL data with the throughput less than the first value based on the second connection, be configured to: perform the at least one operation for transmitting the UL data with the throughput less than the first value based on a ratio of the first value to a total throughput by the first connection and the second connection being less than a threshold ratio.

According to an example embodiment, the at least one communication processor may, as at least part of performing the at least one operation for transmitting the UL data with the throughput less than the first value based on the second connection, be configured to: identify a UL throttling degree and/or a target throughput, based on the ratio of a first value to a total throughput by the first connection and the second connection; and as at least part of performing the at least one operation for transmitting the UL data with the throughput less than the first value based on the second connection, perform the at least one operation, based on the UL throttling degree and/or the target throughput.

According to an example embodiment, the at least one communication processor may, as at least part of performing the at least one operation for transmitting the UL data with the throughput less than the first value based on the second connection, be configured to: perform the at least one operation for transmitting the UL data with the throughput less than the first value based on a buffer state report (BSR) for the second connection exceeding a threshold BSR, and a spectral efficiency of the second connection being equal to or less than a first threshold spectral efficiency.

According to an example embodiment, wherein the at least one communication processor may, as at least part of performing the at least one operation for transmitting the UL data with the throughput smaller than the first value based on the second connection, be configured to: perform the at least one operation for transmitting the UL data with the throughput less than the first value based on a spectral efficiency of the first connection being equal to or greater than a second threshold spectral efficiency.

According to an example embodiment, the at least one communication processor may further be configured to: based on performing the at least one operation for transmitting the UL data with the throughput less than the first value based on the second connection, perform at least one other operation for stopping performing the at least one operation and/or returning to a state prior to performing the at least one operation, based on a difference between a first received strength corresponding to the second connection measured at a time corresponding to performing the at least one operation and a second received strength corresponding to the second connection measured at a current time exceeding a threshold difference.

According to an example embodiment, the at least one communication processor may further be configured to: based on performing the at least one operation for transmitting the UL data with the throughput less than the first value based on the second connection, perform at least one other operation for stopping performing the at least one operation and/or returning to a state prior to performing the at least one operation, based on a spectral efficiency corresponding to the first connection based on performing the at least one operation satisfying a condition for stopping an UL throttling operation.

According to an example embodiment, the at least one communication processor may, as at least part of identifying the at least one first parameter associated with the first connection and the at least one second parameter associated with the second connection, be configured to: identify a first received strength corresponding to the first RAT as the at least one first parameter, and identify a second received strength corresponding to the second RAT as the at least one second parameter.

According to an example embodiment, the at least one communication processor may further be configured to: identify that the first condition is satisfied, based on the first received strength exceeding a first threshold received strength indicating a good uplink channel state; and identify that the second condition is satisfied, based on the second received strength being less than a second threshold received strength indicating a poor uplink channel state.

According to an example embodiment, the at least one communication processor may further be configured to: identify, based on performing the at least one operation, a third received strength corresponding to the first RAT and a fourth received strength corresponding to the second RAT; and stop performing the at least one operation, based on the third received strength and/or the fourth received strength satisfying a stop condition for the at least one operation.

According to an example embodiment, the stop condition may include a condition that the fourth received strength exceeds the second threshold received strength plus an offset. The stop condition may include a condition that the third received strength is less than the first threshold received strength minus the offset, and a difference between the third received strength and the fourth received strength is less than a threshold difference.

According to an example embodiment, the at least one communication processor may, as at least part of identifying the at least one first parameter associated with the first connection and the at least one second parameter associated with the second connection, be configured to: identify a first pathloss corresponding to the first RAT as the at least one first parameter, and identify a second pathloss corresponding to the second RAT as the at least one second parameter; identify that the first condition is satisfied, based on the first pathloss being less than a first threshold pathloss indicating a good uplink channel state; and identify that the second condition is satisfied, based on the second pathloss exceeding a second threshold pathloss indicating a poor uplink channel state.

According to an example embodiment, the at least one communication processor (120 of FIG. 1, 212 or 214 of FIG. 2A, or 260 of FIG. 2B) may further be configured to: identify, based on performing the at least one operation, a third pathloss corresponding to the first RAT and a fourth pathloss corresponding to the second RAT; and stop performing the at least one operation, based on the third pathloss and/or the fourth pathloss satisfying a stop condition for the at least one operation.

According to an example embodiment, the stop condition may include a condition that the fourth pathloss is less than the second threshold pathloss minus an offset. The stop condition may include a condition that the third pathloss exceeds the first threshold pathloss plus the offset, and a difference between the third pathloss and the fourth pathloss is less than a threshold difference.

According to an example embodiment, the at least one communication processor may, as at least part of identifying the at least one first parameter associated with the first connection and the at least one second parameter associated with the second connection, be configured to: identify a first sum of a first pathloss and first power control adjustment state information corresponding to the first RAT as the at least one first parameter, and identify a second sum of a second pathloss and second power control adjustment state information corresponding to the second RAT as the at least one second parameter; identify that the first condition is satisfied, based on the first sum is less than a first threshold pathloss indicating a good uplink channel state; and identify that the second condition is satisfied, based on the second sum exceeding a second threshold pathloss indicating a poor uplink channel state.

According to an example embodiment, the at least one communication processor may further be configured to: identify, based on performing the at least one operation, a third sum of a third pathloss and third power control adjustment state information corresponding to the first RAT and a fourth sum of a fourth pathloss and fourth power control adjustment state information corresponding to the second RAT; and stop performing the at least one operation, based on the third sum and/or the fourth sum satisfying a stop condition for the at least one operation.

According to an example embodiment, the stop condition may include a condition that the fourth pathloss is less than the second threshold pathloss minus an offset. The stop condition may include a condition that the third pathloss exceeds the first threshold pathloss plus the offset, and a difference between the third pathloss and the fourth pathloss is less than a threshold difference.

According to an example embodiment, the at least one communication processor may, as at least part of identifying the at least one first parameter associated with the first connection and the at least one second parameter associated with the second connection, be configured to: identify a first result of multiplying a first spectral efficiency corresponding to the first RAT by a number of multiple-input and multiple-output (MIMO) layers of the first RAT as the at least one first parameter; identify a second result of multiplying a second spectral efficiency corresponding to the second RAT by a number of MIMO layers of the second RAT as the at least one second parameter; identify that the first condition is satisfied, based on the first result exceeds a first threshold spectral efficiency indicating a good uplink channel state; and identify that the second condition is satisfied, based on the second result being less than a second threshold spectral efficiency indicating a poor uplink channel state.

According to an example embodiment, the at least one communication processor may further be configured to: identify, based on performing the at least one operation, a third result of multiplying a third spectral efficiency corresponding to the first RAT by a number of MIMO layers of the first RAT and a fourth result of multiplying a fourth spectral efficiency corresponding to the second RAT by a number of MIMO layers of the second RAT; and stop performing the at least one operation, based on the third result and/or the fourth result satisfying a stop condition for the at least one operation.

According to an example embodiment, the stop condition may include a condition that the fourth result exceeds the second threshold spectral efficiency plus an offset. The stop condition may include a condition that the third result is less than the first threshold spectral efficiency minus the offset, and a difference between the third result and the fourth result is less than a threshold difference.

According to an example embodiment, the at least one communication processor may, as at least part of performing the at least one operation for transmitting the UL data with the throughput less than the first value based on the second connection, be configured to: identify a value of a buffer state associated with the second RAT; and as at least part of performing the at least one operation for transmitting the UL data with the throughput less than the first value based on the second connection, transmit a buffer state report (BSR) having a value smaller than the identified buffer state value.

The at least one communication processor according to an example embodiment may, as at least part of performing the at least one operation for transmitting the UL data with the throughput less than the first value based on the second connection, be configured to: identify some of uplink resources allocated for the second connection as not being used for UL data transmission; and as at least part of transmitting the fourth uplink data based on the second connection based on performing the at least one operation, transmit the fourth uplink data in a rest except for the some of the uplink resources.

According to an example embodiment, the at least one communication processor may further be configured to: based on performing the at least one operation, set, based on a dynamic power sharing (DPS) maximum transmission power set for the first RAT and the second RAT, a first maximum transmission power level corresponding to a first portion of the third uplink data and a second maximum transmission power level corresponding to a second portion of the fourth uplink data in an uplink resource, wherein the first portion and the second portion are transmitted together; and set, independently from the DPS maximum transmission power, a third maximum transmission power level corresponding to a third portion of the third uplink data in an uplink resource, wherein only the third portion is transmitted.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one communication processor comprising processor circuitry, and memory storing instructions,
   wherein the instructions, when executed by the at least one communication processor individually or collectively, cause the electronic device to:
   establish, based on dual connectivity, a first connection corresponding to a first radio access technology (RAT) and a second connection corresponding to a second RAT,
   transmit uplink data via the first connection and the second connection,
   based on identifying that a buffer state report (BSR) for the second connection exceeds a threshold BSR and a spectral efficiency of the second connection is equal to or less than a threshold spectral efficiency, perform an uplink throttling operation associated with the second connection, and
   transmit uplink data via the first connection and the second connection to which the uplink throttling operation is applied.

2. The electronic device of claim 1,
   wherein the instructions, when executed by the at least one communication processor individually or collectively, cause the electronic device to:
   determine to perform the uplink throttling operation based on identifying that a spectral efficiency of the first connection is equal to or greater than a threshold spectral efficiency.

3. The electronic device of claim 1,
wherein the instructions, when executed by the at least one communication processor individually or collectively, cause the electronic device to:
stop performing the uplink throttling operation, based on a difference between a first received strength corresponding to the second connection measured at a time corresponding to performing the uplink throttling operation and a second received strength corresponding to the second connection measured at a current time exceeding a threshold difference.

4. The electronic device of claim 1,
wherein the instructions, when executed by the at least one communication processor individually or collectively, cause the electronic device to:
stop the uplink throttling operation, based on a spectral efficiency corresponding to the first connection based on performing the uplink throttling operation satisfying a condition for stopping the uplink throttling operation.

5. The electronic device of claim 1,
wherein the instructions, when executed by the at least one communication processor individually or collectively, cause the electronic device to:
determine to perform the uplink throttling operation, based on the identifying that a received signal strength corresponding to the second connection is less than a threshold received signal strength indicating a poor channel state.

6. The electronic device of claim 5, wherein the instructions, when executed by the at least one communication processor individually or collectively, cause the electronic device to:
stop performing the uplink throttling operation, based on a received signal strength corresponding to the first connection and/or a received signal strength corresponding to the second connection satisfying a stop condition.

7. The electronic device of claim 6, wherein the stop condition includes:
a condition that the received signal strength corresponding to the second connection exceeds the threshold received signal strength plus an offset, or
a condition that the received signal strength corresponding to the first connection is less than a threshold received signal strength indicating a good channel state minus an offset.

8. The electronic device of claim 1,
wherein the instructions, when executed by the at least one communication individually or collectively, cause the electronic device to:
determine to perform the uplink throttling operation, based on a first pathloss corresponding to the first RAT being less than a first threshold pathloss indicating a good channel state, and a second pathloss corresponding to the second RAT exceeding a second threshold pathloss indicating a poor uplink-channel state.

9. The electronic device of claim 8, wherein the instructions, when executed by the at least one communication processor individually or collectively, cause the electronic device to:
stop performing the uplink throttling operation, based on a third pathloss corresponding to the first RAT and/or a fourth pathloss corresponding to the second RAT satisfying a stop condition.

10. The electronic device of claim 9, wherein the stop condition includes:
a condition that the fourth pathloss is less than the second threshold pathloss minus an offset; or
a condition that the third pathloss exceeds the first threshold pathloss plus the offset, and a difference between the third pathloss and the fourth pathloss is less than a threshold difference.

11. The electronic device of claim 1,
wherein the instructions, when executed by the at least one communication processor individually or collectively, cause the electronic device to:
determine to perform the uplink throttling operation, based on a first sum of a first pathloss and first power control adjustment state information corresponding to the first RAT being less than a first threshold pathloss indicating a good channel state, and a second sum of a second pathloss and seco d power control adjustment state information corresponding to the second RAT exceeding a second threshold pathloss indicating a poor channel state.

12. The electronic device of claim 11, wherein the instructions, when executed by the at least one communication processor individually or collectively, cause the electronic device to:
stop performing the uplink throttling operation, based on the first sum and/or the second sum satisfying a stop condition.

13. The electronic device of claim 1,
wherein the instructions, when executed by the at least one communication processor individually or collectively, cause the electronic device to:
determine to perform the uplink throttling operation, based on a first result of multiplying a first spectral efficiency corresponding to the first RAT by a number of multiple input multiple output (MIMO) layers of the first RAT, exceeding a first threshold spectral efficiency indicating a good channel state, a second result of multiplying a second spectral efficiency corresponding to the second RAT by a number of MIMO layers of the second RAT, being less than a second threshold spectral efficiency indicating a poor channel state.

14. The electronic device of claim 13, wherein the instructions, when executed by the at least one communication processor individually or collectively, cause the electronic device to:
stop performing the uplink throttling operation, based on the first result and/or the second result satisfying a stop condition.

15. The electronic device of claim 1,
wherein the uplink throttling operation comprises:
identifying a value of a buffer state associated with the second connection, and
transmitting a BSR having a value less than the identified buffer state value.

16. The electronic device of claim 1,
wherein the uplink throttling operation comprises:
identifying at least a portion of uplink resources allocated for the second connection as not being used for uplink data transmission; and
transmitting fourth uplink data in uplink resources allocated for the second connection except for the identified at least a portion of the uplink resources.

17. The electronic device of claim 1,
wherein the instructions, when executed by the at least one communication processor individually or collectively, cause the electronic device:

after performing the uplink throttling operation, set, based on a dynamic power sharing (DPS) maximum transmission power set for the first RAT and the second RAT, a first maximum transmission power level corresponding to a first portion of the uplink data transmitted via the first connection and a second maximum transmission power level corresponding to a second portion of the fourth-uplink data transmitted via the second connection to which the uplink throttling operation is applied in an uplink resource, wherein the first portion and the second portion are transmitted together, and set, independently from the DPS maximum transmission power, a third maximum transmission power level corresponding to a third portion of the third-uplink data in an uplink resource, wherein only the third portion is transmitted.

18. The electronic device of claim 1, wherein the instructions, when executed by the at least one communication processor individually or collectively, cause the electronic device to:

obtain a ratio of a throughput corresponding to the second connection to a total throughput corresponding to the first connection and the second connection, based on identifying that the ratio is less than a first threshold ratio and equal to or larger than a second threshold ratio, perform the uplink throttling operation to reduce the throughput of second connection by a first percentage value, based on identifying that the ratio is less than the second threshold ratio and equal to or larger than a third threshold ratio, perform the uplink throttling operation to reduce the throughput of second connection by a second percentage value higher than the first percentage value, and based on identifying that the ratio is less than the third threshold ratio, perform the uplink throttling operation to reduce the throughput of second connection to a target throughput corresponding to a designated throughput value.

19. A method performed by an electronic device, comprising:

establishing, based on dual connectivity, a first connection corresponding to a first radio access technology (RAT) and a second connection corresponding to a second RAT;

transmitting uplink data via the first connection and the second connection;

based on identifying that a buffer state report (BSR) for the second connection exceeds a threshold BSR and a spectral efficiency of the second connection is equal to or less than a threshold spectral efficiency, performing an uplink throttling operation associated with the second connection; and transmitting uplink data via the first connection and the second connection to which the uplink throttling operation is applied.

20. The method of claim 19, further comprises:

determining to perform the uplink throttling operation, based on identifying that a received signal strength corresponding to the second connection is less than a threshold received signal strength indicating a poor channel state and a spectral efficiency of the first connection being equal to or greater than a threshold spectral efficiency.

* * * * *